(12) United States Patent
Greenwald et al.

(10) Patent No.: US 10,261,949 B2
(45) Date of Patent: Apr. 16, 2019

(54) PACKED ROW REPRESENTATION FOR EFFICIENT NETWORK SERIALIZATION WITH DIRECT COLUMN INDEXING IN A NETWORK SWITCH

(71) Applicant: Arista Networks, Inc., Santa Clara, CA (US)

(72) Inventors: Michael Greenwald, Berkeley, CA (US); Stephen Schleimer, Campbell, CA (US); Daniel Greene, Nashua, NH (US)

(73) Assignee: Arista Networks, Inc., Santa Clara, CA (US)

( * ) Notice: Subject to any disclaimer, the term of this patent is extended or adjusted under 35 U.S.C. 154(b) by 26 days.

(21) Appl. No.: 15/274,276

(22) Filed: Sep. 23, 2016

(65) Prior Publication Data
US 2017/0285951 A1    Oct. 5, 2017

Related U.S. Application Data

(60) Provisional application No. 62/317,302, filed on Apr. 1, 2016.

(51) Int. Cl.
*G06F 16/2453* (2019.01)
*G06F 16/245* (2019.01)
*G06F 16/17* (2019.01)
*G06F 3/06* (2006.01)
*H04L 12/947* (2013.01)
(Continued)

(52) U.S. Cl.
CPC ...... *G06F 16/24534* (2019.01); *G06F 3/0604* (2013.01); *G06F 3/067* (2013.01); *G06F 3/0638* (2013.01); *G06F 3/0659* (2013.01); *G06F 16/1734* (2019.01); *G06F 16/245* (2019.01); *G06F 16/24568* (2019.01); *H04L 49/25* (2013.01); *H04L 49/901* (2013.01)

(58) Field of Classification Search
None
See application file for complete search history.

(56) References Cited

U.S. PATENT DOCUMENTS 6,366,915 B1    4/2002   Rubert et al.
6,487,560 B1   11/2002   LaRue et al.
(Continued)

OTHER PUBLICATIONS

IEEE100 The Authoritative Dictionary of IEEE standard terms, published by IEEE press 2000, p. 1133-1134.*
(Continued)

*Primary Examiner* — Tuan V Thai
(74) *Attorney, Agent, or Firm* — Chamberlain, Hrdlicka, White, Williams & Aughtry

(57) ABSTRACT

A method for operating a network element includes obtaining a write request that specifies a variable length data. The method includes identifying a row of a table based on the write request. The method includes processing the row to identify an empty portion of a variable length data storage portion of the row. The method includes determining an offset that that specifies the location of the empty portion. The method includes storing the offset and a length of the variable length data in a fixed length storage element of the fixed length data storage portion. The method includes storing the variable length data in the empty portion of the variable length data storage portion.

18 Claims, 20 Drawing Sheets

(51) Int. Cl.
*H04L 12/879* (2013.01)
*G06F 16/2455* (2019.01)

(56) References Cited

U.S. PATENT DOCUMENTS

| | | |
|---|---|---|
| 6,502,093 B1 | 12/2002 | Bhatt et al. |
| 6,732,124 B1 | 5/2004 | Koseki et al. |
| 6,834,276 B1 | 12/2004 | Jensen et al. |
| 6,910,070 B1 | 6/2005 | Mishra et al. |
| 7,177,859 B2 | 2/2007 | Pather et al. |
| 7,360,202 B1 | 4/2008 | Seshadri et al. |
| 7,698,276 B2 | 4/2010 | Seshadri et al. |
| 8,150,959 B1 | 4/2012 | Bezdicek et al. |
| 8,631,034 B1 | 1/2014 | Peloski |
| 8,914,404 B1 | 12/2014 | Kim et al. |
| 9,009,289 B1 | 4/2015 | Jacob |
| 2002/0004736 A1 | 1/2002 | Roundtree et al. |
| 2002/0007363 A1 | 1/2002 | Vaitzblit |
| 2003/0018644 A1 | 1/2003 | Bala et al. |
| 2004/0098425 A1 | 5/2004 | Wiss et al. |
| 2005/0165731 A1 | 7/2005 | Funk |
| 2007/0050392 A1 | 3/2007 | Shukla et al. |
| 2007/0266331 A1 | 11/2007 | Bicker et al. |
| 2008/0104008 A1 | 5/2008 | Brantley et al. |
| 2008/0162849 A1* | 7/2008 | Savagaonkar ........ G06F 12/145 711/163 |
| 2008/0165943 A1 | 7/2008 | Gonzalez Lopez et al. |
| 2008/0208672 A1 | 8/2008 | Van Riel et al. |
| 2008/0208806 A1 | 8/2008 | Dalfo et al. |
| 2008/0300706 A1 | 12/2008 | Ruml et al. |
| 2009/0024752 A1 | 1/2009 | Shitomi |
| 2009/0063381 A1 | 3/2009 | Chan et al. |
| 2009/0234680 A1 | 9/2009 | Newton |
| 2009/0300528 A1 | 12/2009 | Stambaugh |
| 2010/0161555 A1 | 6/2010 | Nica et al. |
| 2010/0281102 A1 | 11/2010 | Chinta et al. |
| 2011/0055231 A1 | 3/2011 | Huck et al. |
| 2011/0214050 A1 | 9/2011 | Stambaugh |
| 2011/0314047 A1 | 12/2011 | Koronthaly et al. |
| 2011/0320620 A1 | 12/2011 | Cutler et al. |
| 2012/0005220 A1 | 1/2012 | Schindlauer et al. |
| 2012/0023077 A1 | 1/2012 | Kann et al. |
| 2012/0112893 A1 | 5/2012 | Bezdicek et al. |
| 2012/0190325 A1 | 7/2012 | Abu-Hakima et al. |
| 2012/0310906 A1 | 12/2012 | Miller et al. |
| 2013/0041781 A1 | 2/2013 | Freydberg |
| 2013/0150007 A1 | 6/2013 | Wang et al. |
| 2013/0188515 A1 | 7/2013 | Pinheiro et al. |
| 2014/0095535 A1 | 4/2014 | Deshmukh et al. |
| 2014/0310258 A1* | 10/2014 | Tian ................. G06F 17/30445 707/718 |
| 2014/0317084 A1 | 10/2014 | Chaudhry et al. |
| 2015/0009818 A1 | 1/2015 | Xiao et al. |
| 2015/0149631 A1 | 5/2015 | Lissack |
| 2015/0193477 A1 | 7/2015 | Dumant et al. |
| 2015/0207794 A1 | 7/2015 | Lee et al. |
| 2016/0098450 A1 | 4/2016 | Tandon et al. |
| 2017/0063948 A1 | 3/2017 | Shroff et al. |
| 2017/0177697 A1 | 6/2017 | Lee et al. |

OTHER PUBLICATIONS

What is a Database Schema published by Database Guide 2016 defines terms and structures commonly known in database.*
Allan et al (Record Architecture for a Relational Database Management System Supporting Null Values and Extensible Tables, IP.com 2005.*

* cited by examiner

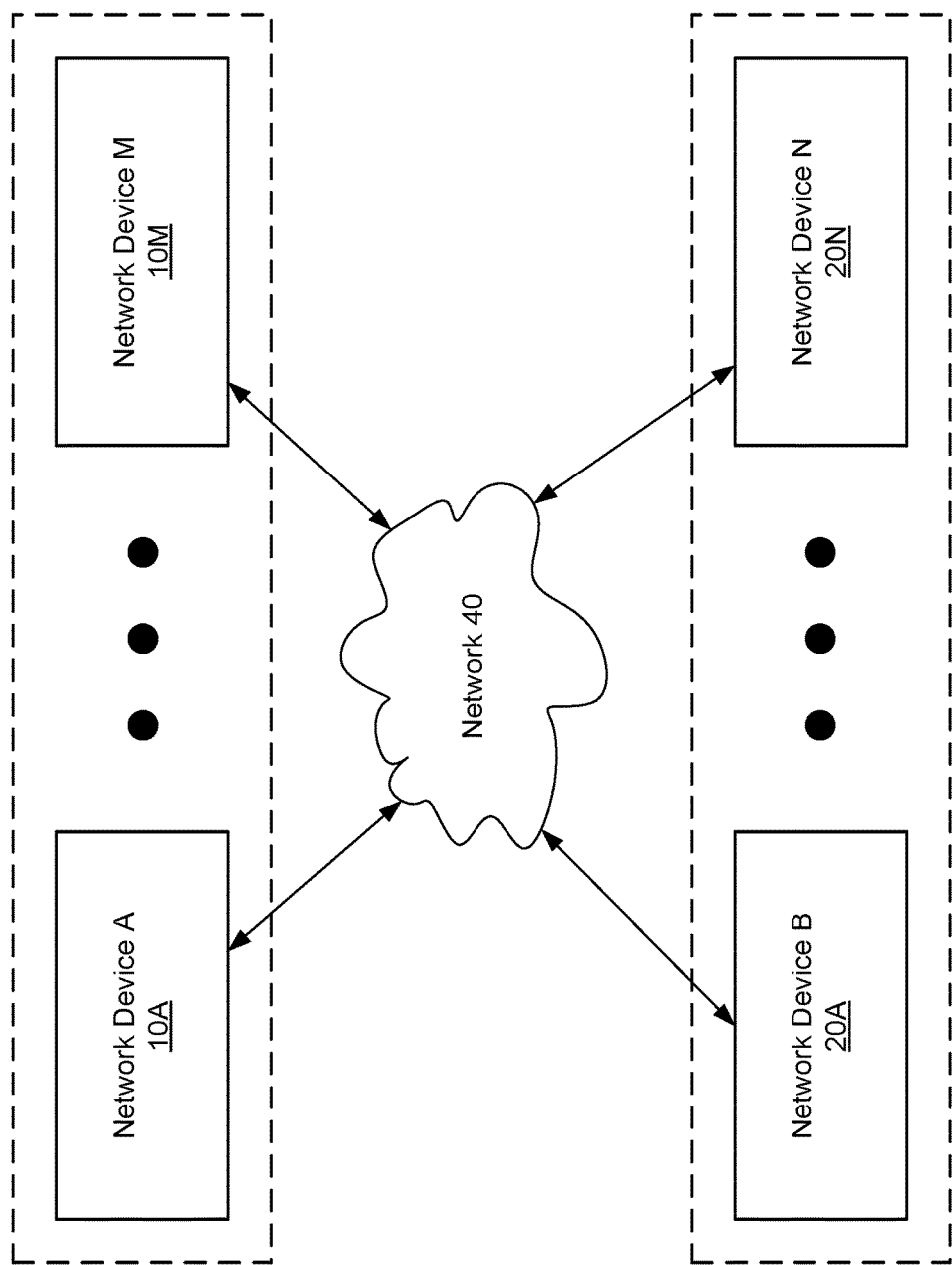

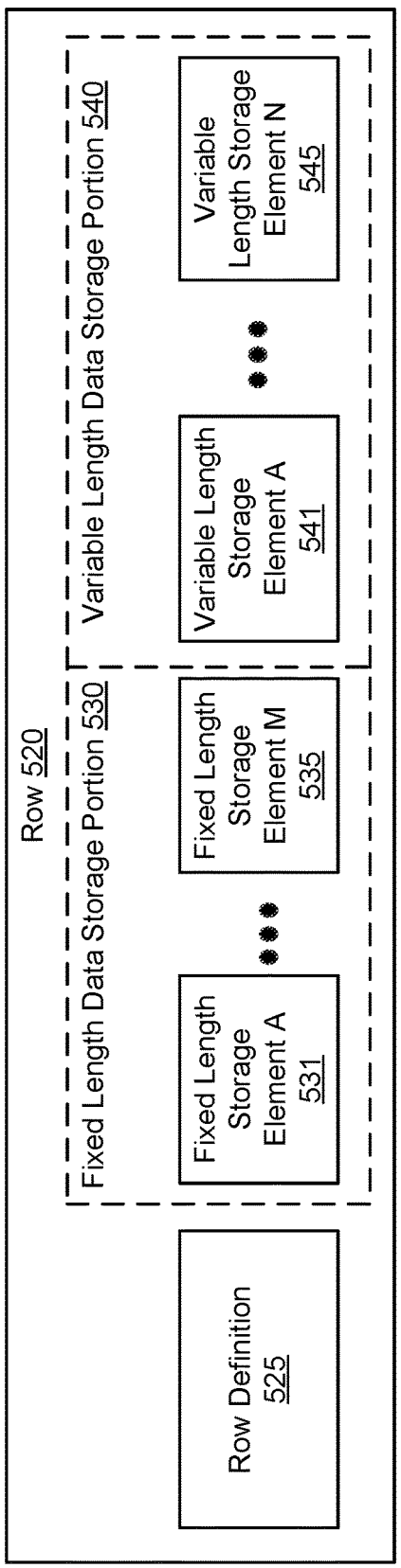
FIG. 5B
FIG. 5D
FIG. 5C

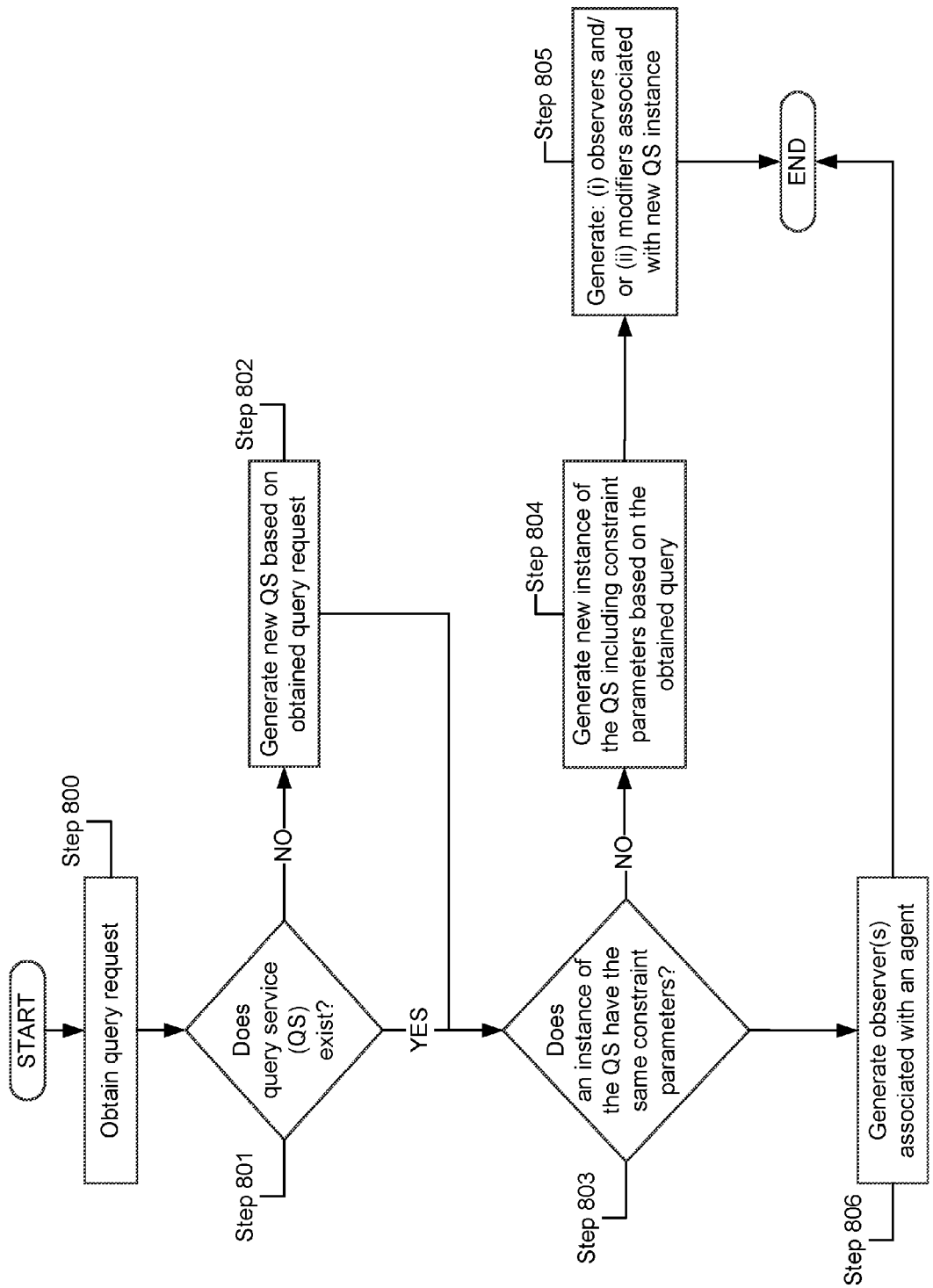

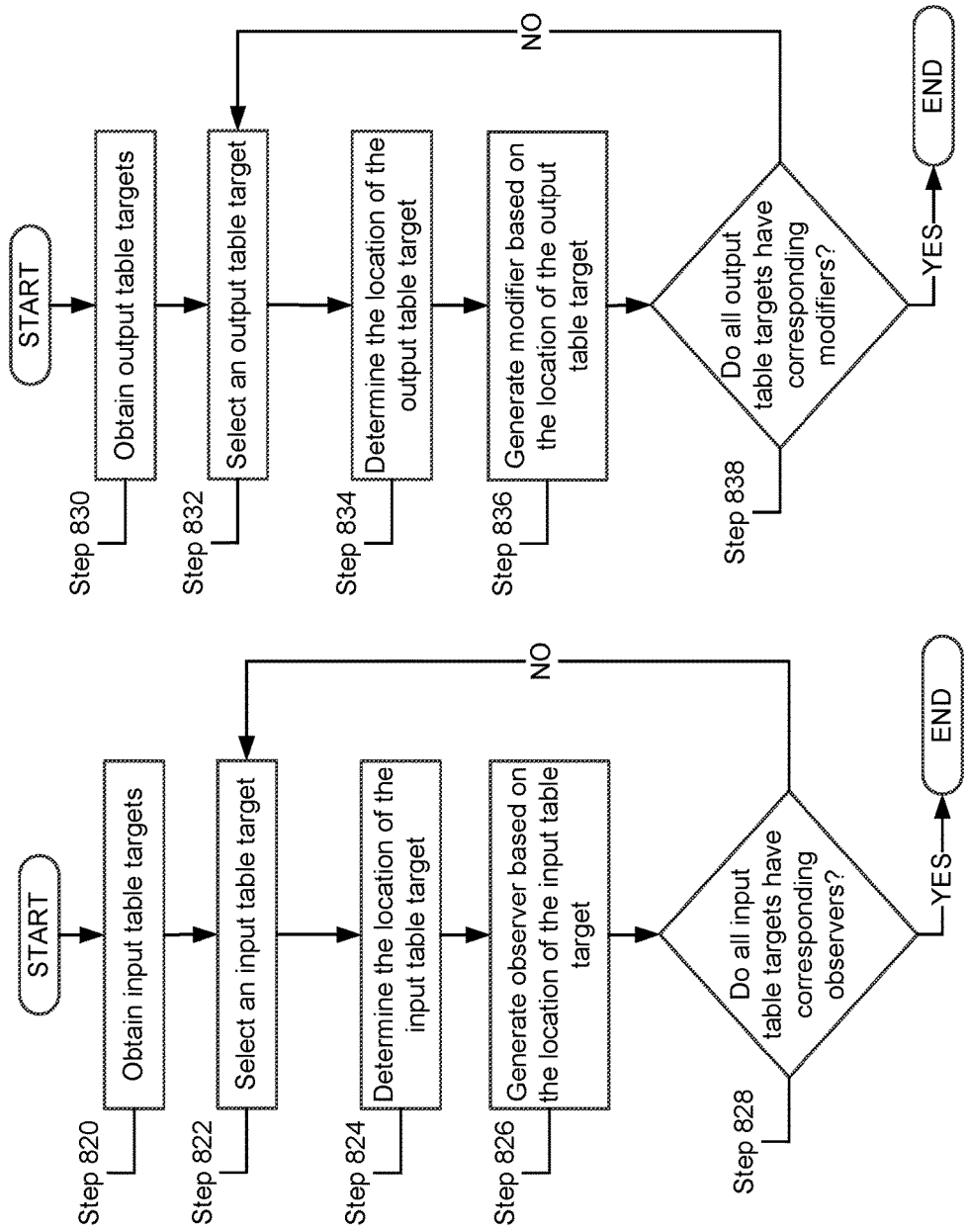

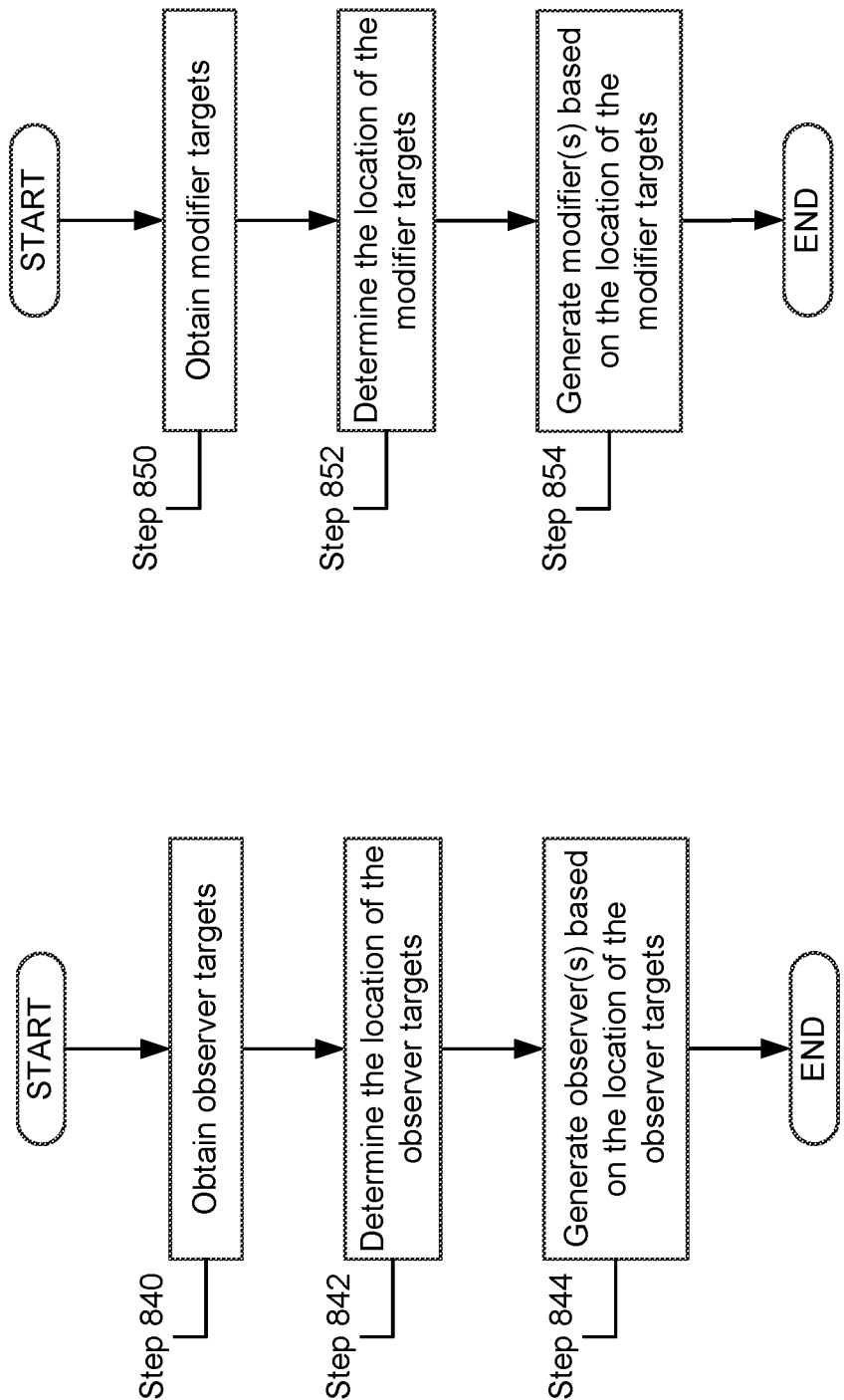

PACKED ROW REPRESENTATION FOR EFFICIENT NETWORK SERIALIZATION WITH DIRECT COLUMN INDEXING IN A NETWORK SWITCH

BACKGROUND

Computing devices may store information in memory. In a network environment, multiple computing devices may interact as components of a system. Sometimes computing devices in a first location need to access information stored in the memory of a second computing device in a second location. Similarly, computing devices in a first location may need to write information to the memory of a second computing device.

SUMMARY

In one aspect, a network element in accordance with embodiments of the invention includes a computer hardware processor and a memory that is accessible by the computer processor. The memory stores a database and multiple rows. A row of the multiple rows includes a fixed length data storage portion and a variable length data storage portion. The database executes on the computer hardware processor and is programmed to obtain a write request that specifies a variable length data, process the row to identify an empty portion of the variable length data storage portion, determine an offset that specifies the location of the empty portion, store the offset and a length of the variable length data in a fixed length storage element of the fixed length data storage portion, and store the variable length data in the empty portion of the variable length data storage portion.

In one aspect, a non-transitory computer readable medium in accordance with embodiments of the invention includes instructions which when executed by a process performs a method. The method includes obtaining a write request that specifies a variable length data, identifying a row of a table based on the write request, processing the row to identify an empty portion of a variable length data storage portion of the row, determining an offset that that specifies the location of the empty portion, storing the offset and a length of the variable length data in a fixed length storage element of the fixed length data storage portion, and storing the variable length data in the empty portion of the variable length data storage portion.

In one aspect, a method for operating a network element in accordance with embodiments of the invention includes obtaining a write request that specifies a variable length data, identifying a row of a table based on the write request, processing the row to identify an empty portion of a variable length data storage portion of the row, determining an offset that that specifies the location of the empty portion, storing the offset and a length of the variable length data in a fixed length storage element of the fixed length data storage portion, and storing the variable length data in the empty portion of the variable length data storage portion.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1A shows a diagram of a system in accordance with one or more embodiments of the invention.

FIG. 5B shows a row of a table of a database in accordance with one or more embodiments of the invention.

FIG. 5C shows a fixed length storage element of a database in accordance with one or more embodiments of the invention.

FIG. 5D shows a fixed length storage element of a database in accordance with one or more embodiments of the invention.

FIG. 8A shows a flowchart of a method of generating a standing query instance in accordance with one or more embodiments of the invention.

FIG. 8B shows a flowchart of a method of generating observers in accordance with one or more embodiments of the invention.

FIG. 8C shows a flowchart of a method of generating modifiers in accordance with one or more embodiments of the invention.

FIG. 8D shows a flowchart of a second method of generating observers in accordance with one or more embodiments of the invention.

FIG. 8E shows a flowchart of a second method of generating modifiers in accordance with one or more embodiments of the invention.

DETAILED DESCRIPTION

Figure 1B:
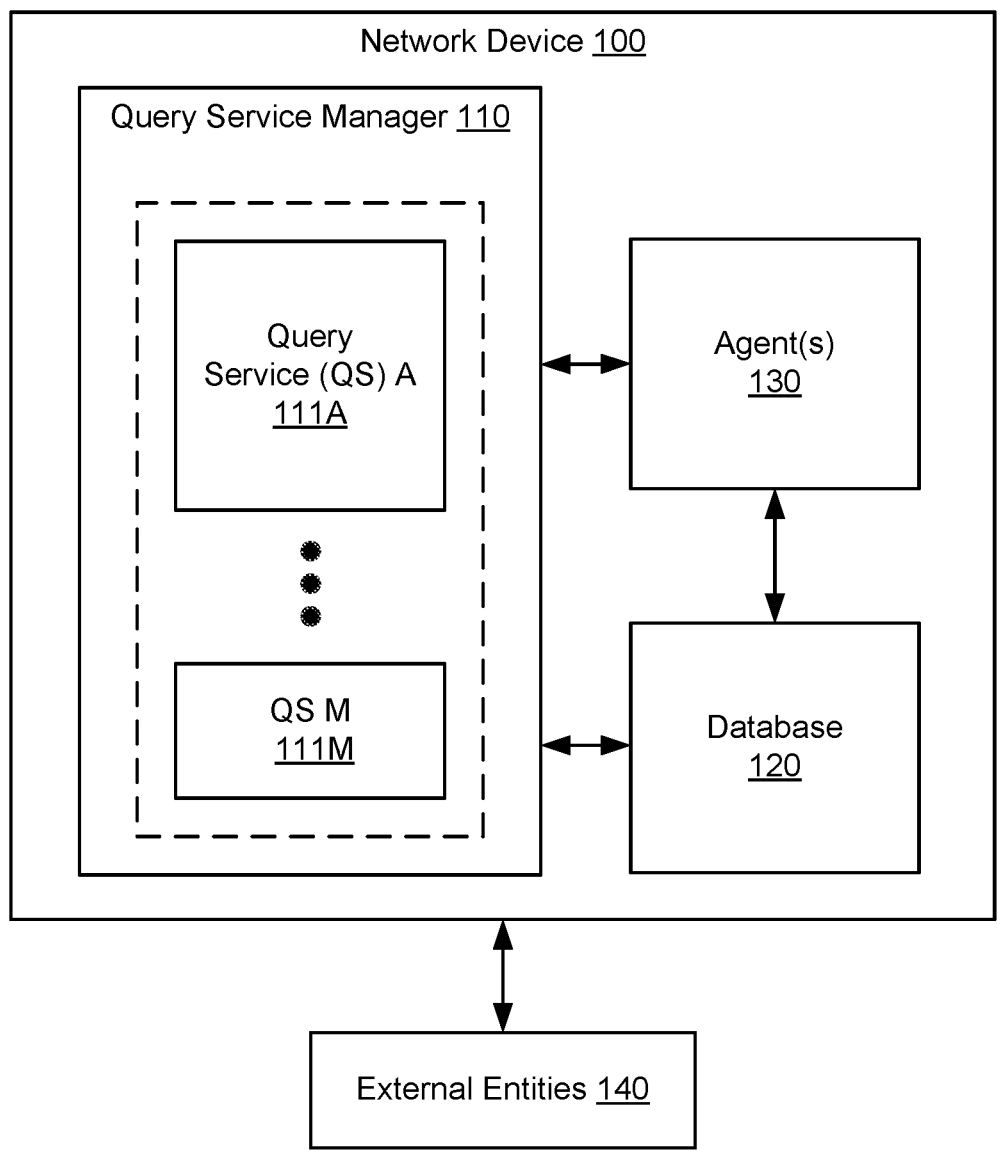
FIG. 1B shows a diagram of a network device in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In general, embodiments of the invention relate to methods and systems for storing and/or accessing information stored in one or more network devices. Each of the network devices may be a router, switch, multilayer switch, or other device that may support network communications or may interact with other devices through the network.

The stored information may relate to a state of the network device, a state of a network to which a network device is connected, and/or a state of one or more services operating on a network device. For example, the stored information may be a temperature of a component of the network device. The component may be, for example, a processor. In another example, the stored information may be an accessibility of another network device. The stored information may be other information without departing from the invention.

A network device in accordance with one or more embodiments of the invention may include a database. The database may include tables that store information. In one or more embodiments of the invention, the database may span across multiple network devices, e.g., portions of the database may be stored on storage of a first network device and other portions of the database may be stored on storage of a second network device. In one or more embodiments of the invention, duplicate copies of information stored in the database may be stored on the first network device and the second network device. In one or more embodiments of the invention, a database planner may manage the consistency of the database across one or more network devices, e.g., may make copies of information stored on a first network device.

In one or more embodiments of the invention, tables of the data base may include rows. At least one of the rows may be divided into a fixed length data storage portion and a variable length data storage portion. Data that is of a fixed length may be stored in the fixed length data storage portion and data that has a length that is different than the length of the data stored in the fixed length data storage portion may be stored in the variable length data storage portion. When data is stored in the fixed length data storage portion, an offset that specifies a location of the data stored in the variable length data storage portion may be stored in a fixed length storage element of the fixed length data storage portion. A length of the data stored in the variable length data storage portion may also be stored in the fixed length storage element. The offset and length may enable the data stored in the variable length data storage portion to be retrieved using information included in the row and thereby reduce processing and storage system accessing requirements to retrieve the data.

In one or more embodiments of the invention, when an entity accesses a datum stored in a variable length data storage portion of the row, the offset and length stored in a fixed length storage element of a fixed length data storage portion that is associated with the data stored in the variable length data storage portion is used to read the data. Said another way, the fixed length data storage element may act as a key that enables the data stored in the variable length data storage portion to be read directly without referencing or accessing another table, data structure, or entity.

The network device may include a query service manager (QSM). The QSM may generate and/or manage query service instances (QSI)s that operate on information stored in the database. QSIs may be generated in response to requests from other entities. In one or more embodiments of the invention, the other entities may be agents executing on the network device or agents executing on other network devices.

Each instance of a QSI may include an input table, a query, and may generate an output. In one or more embodiments of the invention, a QSI may include one or more input tables and may generate one or more output tables. A QSI may operate on entries of the input table to produce the output. In one or more embodiments of the invention, the QSI may generate an output in response to a change in an input table of the QSI. In one or more embodiments of the invention, the QSI may generate an output after one or more predetermined changes to the input table have occurred. In one or more embodiments of the invention, the QSI may produce an output at a predetermined time, e.g., periodically or at one or more predetermined times.

The entries of input tables of a QSI may be generated by observers. Observers may monitor entries of the database and/or output tables of other QSIs and propagate changes to the database and/or output tables to input tables associated with the observer. In one or more embodiments of the invention, observers may notify QSIs of changes to entries of the database and/or output table and the changes may be propagated to the QSIs by entities other than observers, e.g., state machines or other programs executing on the network device. In one or more embodiments of the invention, observers may also propagate changes to entries of the database to one or more agents of the network device. The observers may be configured to access data in a row that is divided into a fixed length data storage portion and/or a variable length data storage portion.

In one or more embodiments of the invention, the output produced by the query of a QSI may be propagated to an output table by a modifier. In one or more embodiments of the invention, multiple modifiers may propagate the output to multiple output tables. Modifiers may monitor queries of QSIs and propagate the output of the queries to output tables in response to changes in the output of the query. In one or more embodiments of the invention, the output table may be a portion of the database, e.g., a table of the database or entries of a table of the database. The modifier may be configured to store data in a row that is divided into a fixed length data storage portion and/or a variable length data storage portion. The data may be stored in one of the portions based on a type of the data, e.g., fixed length or variable length.

FIG. 1A shows an example of a network in accordance with one or more embodiments of the invention. The example network shown in FIG. 1 includes network devices (10A-10N) operably connected to one another. Each of the aforementioned network devices may be interconnected by a network (40) supporting one or more networking protocols. For example, network device 10A may be connected by operable communication links to network devices 10M, 20A, and 20N as indicated by the arrows. The network (40) may include any number of network devices without departing from the invention. Additionally, each of the aforementioned network devices may include any number of communication links without departing from the invention. In one embodiment of the invention, the network (40) may be the Internet.

FIG. 1B shows a network device (100) in accordance with one or more embodiments of the invention. The network device (100) may be programmed to store information in a database (120) and generate outputs based on the information stored in the database (120) by one or more QSIs.

The network device (100) may be a physical device that includes non-transitory storage, memory (e.g. Random Access Memory), and one or more processors. The non-transitory storage may include instructions which, when executed by the one or more processors, enable the network device (100) to perform the functions described in this application and shown in FIGS. 8A-10C.

The network device (100) may include a QSM (110), one or more query services (111A-111M), a database (120), and a one or more agents (130). The network device (100) may be operably connected to one or more entities (140). The entities (140) may be, for example, other network devices, servers, or computing devices accessible by a network. Agents (130) may be executing on the other entities (140). Each of the components of the network device (100) is described below.

The network device (100) may include a database (120). The database (120) may be a managed storage database that controls read and/or write access to information stored in the database. Read access to the database (120) may be provided by one or more observers and write access to the database may be provided by one or more modifiers. Observers and modifiers may be dynamically generated and removed. Observers and modifiers may be registered with the database (120) and thereby notify the database (120) of their presence. The interaction of observers and modifiers with the database are described in greater detail with respect to FIGS. 6-7.

As will be described in greater detail with respect to FIGS. 5A-5F, tables of the database (120) may include rows that are divided into portions for storing fixed length data and portions for storing variable length data. The observers may include functionality to perform the methods shown in FIGS. 10A and 10B to read data from rows that are divided into portions. The modifiers may include functionality to perform the method shown in FIG. 10C to write data to rows that are divided into portions.

Figure 2:
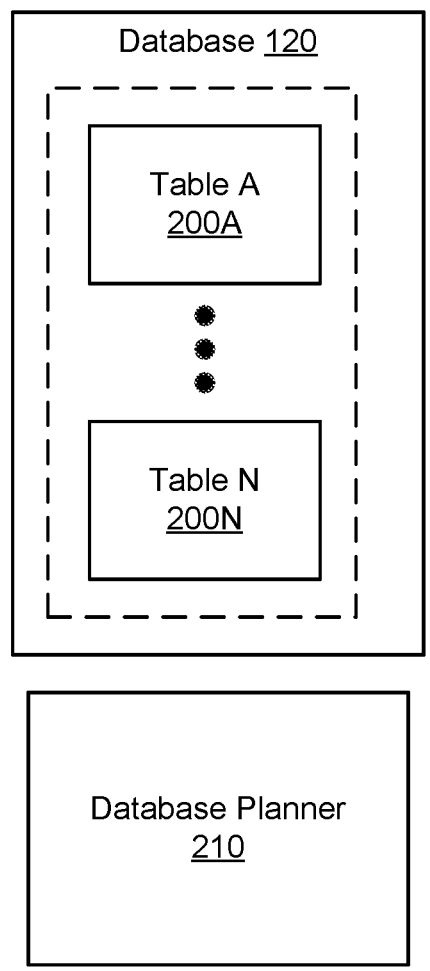
FIG. 2 shows a database accordance with one or more embodiments of the invention.

In one or more embodiments of the invention, the database (120) may include one more tables (200A-200N) as shown in FIG. 2. The tables (200A-200N) may be data structures for storing information on a computer readable storage medium of the network device (100). Each element of each table may include one or more information elements. Information elements may be, for example, integers, characters, floating point values, addresses, or any other type of data.

Figure 5A:
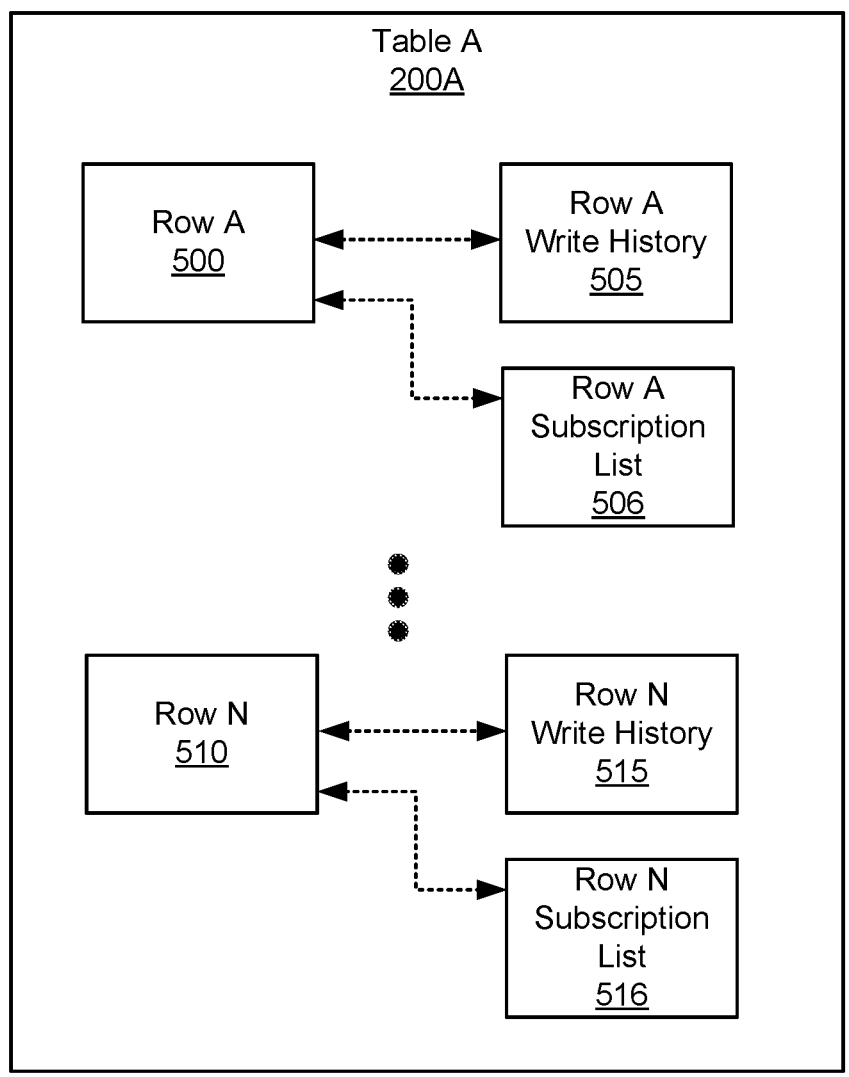
FIG. 5A shows a table of a database in accordance with one or more embodiments of the invention.

FIG. 5A shows an example of Table A (200A) in accordance with one or more embodiments of the invention. Table A (200A) includes a number of information elements (500, 510). As discussed above, each information element may include data of varying type.

In one or more embodiments of the invention, the database (120) may include a write history associated with each information element of each table of the database (120). The write history of an information element of a table may include a list of modifications, e.g., writes, to the element and the time of each modification. The list of modifications may include all of the modifications or a portion of the modifications. For example, information element A (500) may have an associated element A write history (505) that includes one or more modifications that have been made in a sequence to information element A (500). While the element A write history (505) is shown as being a part of Table A (200A) in FIG. 5, the write history of each information element of each table may be stored in other locations without departing from the invention.

In one or more embodiments of the invention, the database (120) may include a subscription list (506) associated with each information element of each table of the database (120). The subscription list (506) associated with each element may be a list of observers and/or modifiers, registered with the database, that interact with the associated information element. When an information element is updated, e.g., written to an information element by a modifier, the database may notify each entity listed in the subscription list (506) associated with the information element that the information element was updated.

In one or more embodiments of the invention, each subscription list associated with each information element of the database (120) may include a history list position of each observer. Observers may read information from the database at predetermined times, periodically, and/or in real-time in response to notifications of updates to information from the database (120). When an observer requests to read information from an information element of the database (120), the database (120) may return one or more modifications listed in the write history list, associated with the information element, having a write time that is later than a write time of the history list position. By sending one or more of the modifications having a write time that is later than the write time of the history list position, information written to the information element may be provided to the observer and thereby propagated to any requesting entities. The database (120) may update the history list position of the observer as the observer reads modifications from the history list.

While the write history and subscription list have been described as being associated with individual elements of the database, the write history and/or subscription list may be associated with collections of elements, entire tables, or other groupings of data stored in the database without departing from the invention.

In one or more embodiments of the invention, when an observer requests to read information from an information element of the database (120), the database (120) may continue to return modifications until the history list position of the observer is updated to the most recent modification.

In an example, information element A (500) may have an associated element A subscription list (506) and information element N (510) may have an associated element N subscription list (516). Each of the subscription lists (506, 516) may include a listing of observers that are observing information elements A (500) and N (510), respectively. Each of the subscription lists (506, 516) may also include the history list position of each observer with respect to element A write history (505) and element N write history (515). The history list position of each observer with respect to each write history may be different, e.g., a first observer may have a history list position that is at a later time than a history list position of a second observer that is observing the same information element as the first observer. Thus, each information element may have a different subscription list and each entity listed in the subscription list may have a different history list location.

While the element A subscription list (506) and element N subscription list (516) are shown as being a part of Table A (200A) in FIG. 5, the subscription list associated with each information element of each table may be stored in other locations without departing from the invention.

In some embodiments of the invention, a row of a table may be divided into a portion for storing fixed length data and a second portion for storing variable length data. As used herein, fixed length data refers to that data that has a predetermined length, e.g., each datum of the data has a same length. In contrast, as used herein, variable length data refers to data that does not have the predetermined length, e.g., any datum with a length that is different than the length of a datum of the fixed length data.

FIG. 5B shows a row (520) of a table in accordance with embodiments of the invention. The row (520) includes a row definition (525), a fixed length data storage portion (530), and a variable length data storage portion (540). Each component of the row (520) is described below.

The row definition (525) may be data that describes the topology of the row (520). More specifically, the row definition (525) may include an offseta flag, or other information that specifies the portion of the row that is the fixed length data storage portion (530) and the second portion of the row (520) that is the variable length data storage portion (540).

For example, the row definition (525) may include an offset from the start of the row (520) that specifies the start of the variable length data portion (540) of the row (520). In another example, the row definition (525) may be a flag stored at a location in the row that delineates the fixed length data storage portion (530) and the variable length data storage portion (540) of the row (520). While shown as being at the start of the row (520) in FIG. 5B, the row definition (525) may be located anywhere within the row (520) without departing from the invention.

The fixed length data storage portion (530) may be a portion of the row that stores fixed length data having a predetermined length. The fixed length data storage portion (530) may include a number of fixed length storage elements (531, 535). Each of the elements may store a datum (532) having the predetermined length as shown in FIG. 5C. In other words, a predetermined number of bytes of storage may be allocated to each of the fixed length storage elements (531, 535). For example, each of the fixed length storage elements (531, 535) may store a datum having a length of 4 bytes. In another example, each of the fixed length storage elements (531, 535) may store data having a length of less than 8 bytes if each fixed length storage elements is allocated 8 bytes.

Returning to FIG. 5B, parsing the row (520) to read fixed length storage elements may be performed by offsetting from the start of the fixed length data storage portion (530) by a number of bytes equal to the predetermined length of each element multiplied by the number of elements into the fixed length data storage portion at which the to be read fixed width data is stored. The fixed length data storage element may then be read by reading a number of bytes starting at the location specified by the determined offset.

In one or more embodiments of the invention, the offset may be calculated multiplying the number of elements to be offset by a length of each of the elements. In some embodiments of the invention, the offset to each fixed length element may be computed at the time the fixed length element is written and the offset may be stored in the header and, thereby, the offset may only be calculated once rather than on the fly when accessing fixed length storage elements. In other embodiments of the invention, the length of each fixed length element may be stored in the header and, thereby, an offset may be calculated by multiplying the length stored in the header by the number of elements to be offset to obtain the fixed length storage element.

In one or more embodiments of the invention, each of the fixed length storage elements (535, 535) may also be capable of storing information, rather than a datum of a predetermined length, that specifies a location of a variable length data stored in the variable length data storage portion (540). As will be discussed in greater detail below, storing information that specifies a location of a variable length data may enable the network device to read variable length data stored in the variable length data storage portion (540) without referring to another data structure other than the row (520).

The variable length data storage portion (540) may be a portion of the row that stores variable length data. Each datum of the variable length data may have any length and/or, more specifically, a length that is different than the predetermine length of each element of the fixed length data storage portion (530). The variable length data storage portion (540) may include a number of variable length storage elements (541, 545). Each of the variable length data storage elements (541, 545) may be of any length. Data of variable length may be dynamically stored in the variable length data storage portion (540) and thereby arbitrarily divide the variable length data storage portion (540) into variable length elements as necessary to accommodate storage of each variable length data.

Whenever a variable length data is stored in the variable length storage portion (540), an offset (533) and length (534) may be stored in a fixed length storage element (531, 535) as shown in FIG. 5D. The offset and length may specify a location and length of the variable length data. The offset (533) may be a number of bytes. The offset (533) may be with reference to any portion of the row (520). For example, the offset (533) may be with reference to the start of the fixed length data storage portion, the variable length data storage portion, or any other portion of the row (520).

Parsing the row (520) to read a variable length storage element may be performed by first reading a fixed length storage element (531, 535) that specifies the offset (533) and length (534) associated with the variable length data. The variable length data may be read by offsetting from a reference location by a number of bytes specified by the offset read from the fixed length storage element (531, 535) and reading a number of bytes specified by the length (534).

In one or more embodiments of the invention, arrays may be stored in variable length data storage elements. The arrays may include elements that are of fixed length or of variable length.

Figure 5E:
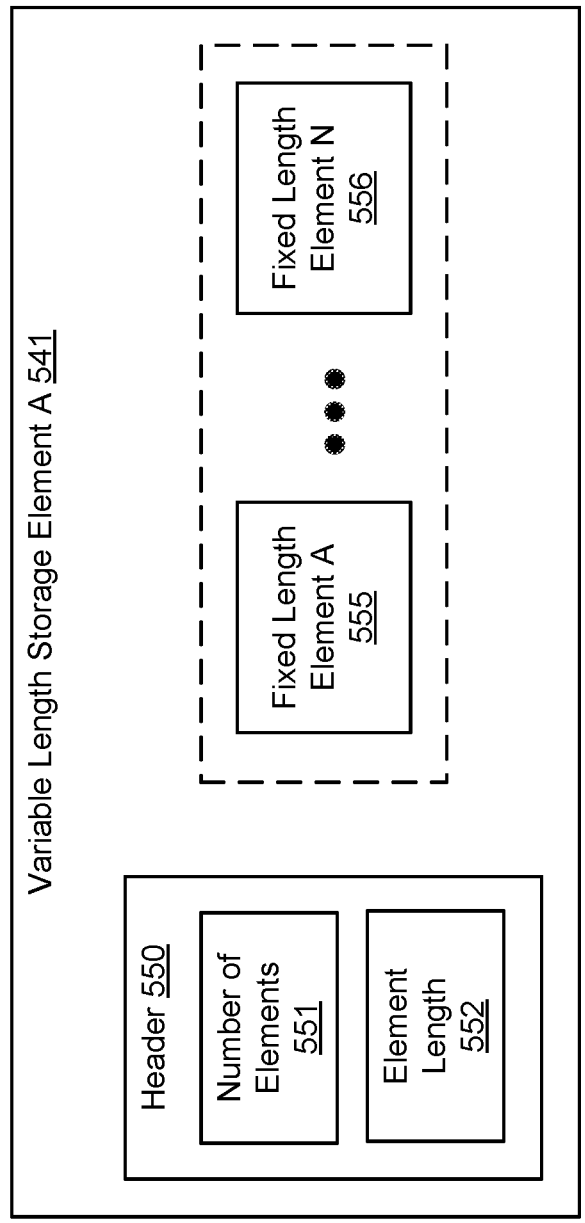
FIG. 5E shows a variable length storage element of a database in accordance with one or more embodiments of the invention.

FIG. 5E shows a variable length storage element A (541) in accordance with embodiments of the invention. The variable length storage element A (541) stores an array including a number of fixed length elements (555, 556). Each of the fixed length elements (555, 556) store an element of the array. In addition, the variable length storage element A (544) includes a header (550). The header (550) specifies a number of elements (551) of the array and an element length (552) of each element of the array. In some embodiments of the invention, a flag or other indicator that specifies whether fixed length storage elements are present in the row may also be stored in the header (550).

Parsing the variable length storage element A (541) to read the array may be performed by first reading the header (550) that specifies the number of elements of the array and the element length of each element of the array. The elements of the array may be read by sequentially reading a number of bytes equal to the element length. Each sequentially read number of bytes specifies an element of the array.

The process of sequential reading may stop when the number of elements specified by the header have been read.

When an array is stored in the variable length storage element A (541), the number of elements (551) and element length (552) are stored in the header (550). Each element of the array is stored as a fixed length element (555, 556). Additionally, like any other variable length data, an offset (533) and length (534) may be stored in a fixed length storage element (531, 535) as shown in FIG. 5D so that the array stored in the variable length storage element A (541) may be directly accessed via information stored only the row (520).

Figure 5F:
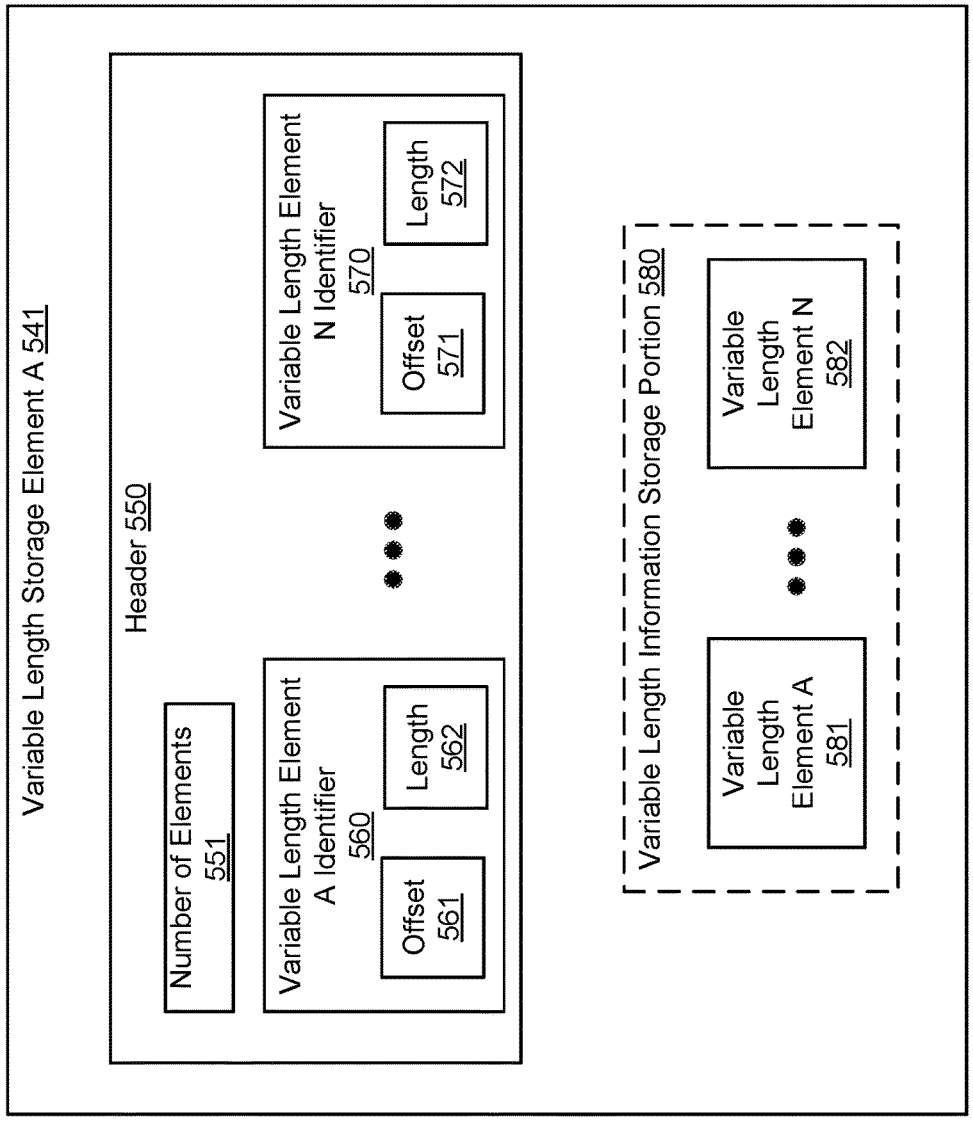
FIG. 5F shows a variable length storage element of a database in accordance with one or more embodiments of the invention.

FIG. 5F shows a variable length storage element A (541) in accordance with embodiments of the invention. The variable length storage element A (541) stores an array including a number of variable length elements (581, 582). Each of the variable length elements (581, 582) stores an element of the array. In addition, the variable length storage element A (541) includes a header (550). The header (550) specifies a number of elements (551) of the array and a number of variable length element identifiers (560, 570). Each of the variable length element identifiers (560, 570) include an offset (561, 571) and a length (562, 572). Each offset specifies a location of a variable length element (581, 582) and each length specifies a length of a variable length element (581, 582). In one or more embodiments of the invention, the location of the variable length element (581, 582) specifies an offset from a start of the variable length information storage portion (580).

Parsing the variable length storage element A (541) to read the array may be performed by first reading the header (550). Each element of the array may be read by offsetting a number of bytes specified by the offset (561, 571) and by reading a number of bytes starting at the offset location specified by the length (562, 572). Each variable length element identifier (560, 570) may be associated with one of the variable length elements (581, 582) and the included offset and length may be used to read the associated variable length element.

When an array is stored in the variable length storage element A (541), the number of elements (551) and variable length element identifiers (560, 570) are stored in the header (550). Each element of the array is stored in as a variable length element (581, 582).

In one or more embodiments of the invention, an element of the array may be stored in a variable length element, a variable length element identifier may be generated based on the location of the variable length element and the length of the element of the array, the variable length element identifier may be stored in the header, and the process may be repeated for each element of the array. Once all of the elements are stored, the number of stored elements may be tallied and stored as the number of elements (551) in the header (550).

Additionally, like any other variable length data, an offset (533) and length (534) may be stored in a fixed length storage element (531, 535) as shown in FIG. 5D so that the array stored in the variable length storage element A (541) may be directly accessed via information stored only the row (520).

Figure 3:
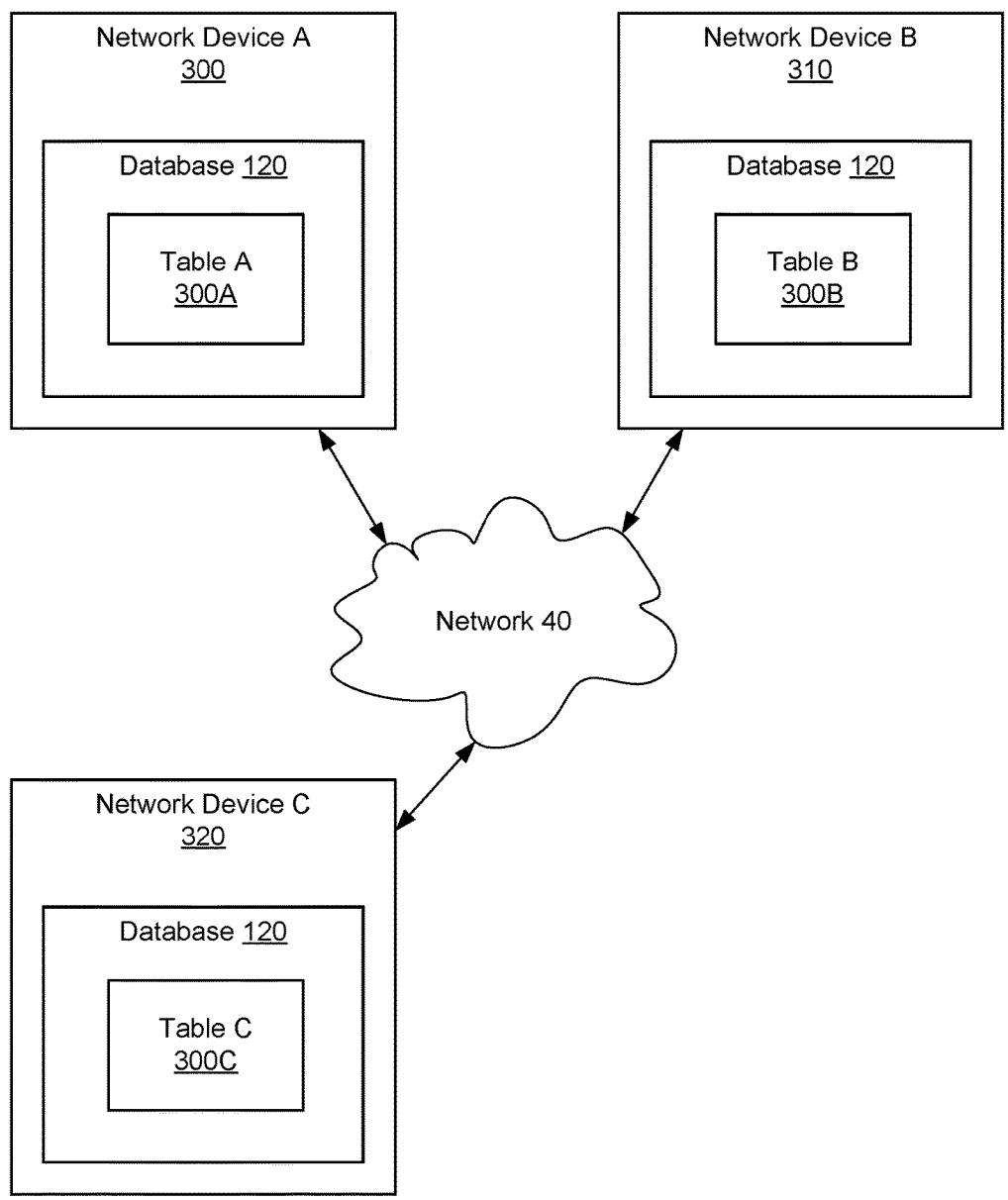
FIG. 3 shows a diagram of a database distributed across multiple network devices in accordance with one or more embodiments of the invention.
Figure 4:
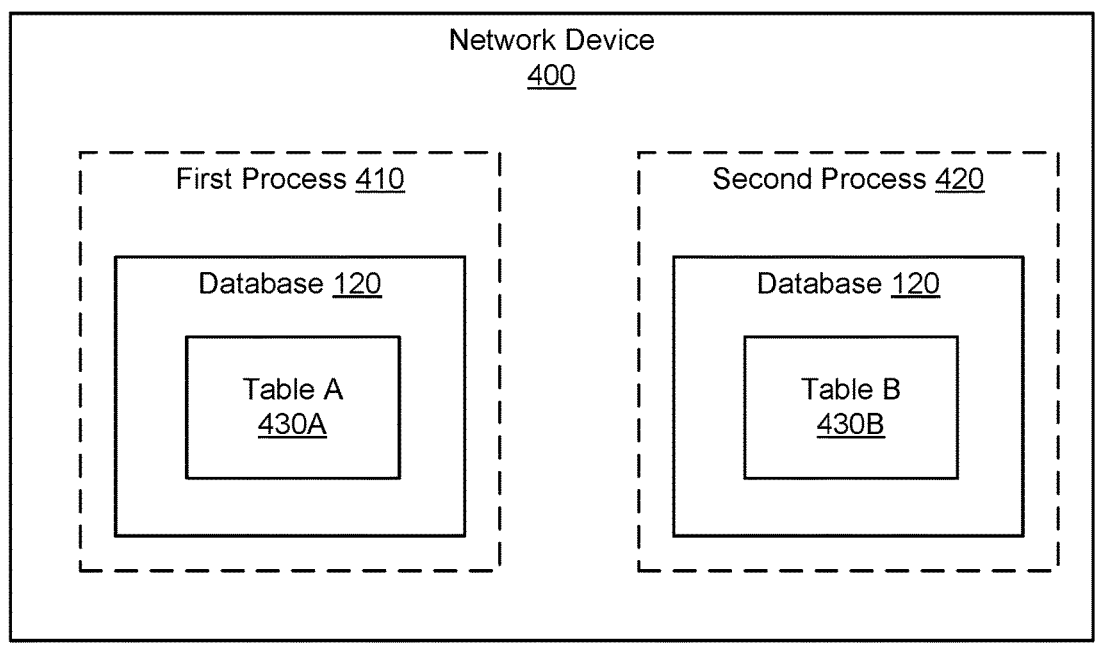
FIG. 4 shows a diagram of a database distributed across multiple processes in accordance with one or more embodiments of the invention.

Returning to FIG. 2, the database (120) may include tables (200A-200N) that are located on multiple network devices and/or are stored in multiple address spaces. FIGS. 3 and 4 illustrate examples of tables distributed across multiple devices and/or multiple address spaces.

In one or more embodiments of the invention, the database (120) may span across multiple network devices as shown in FIG. 3. FIG. 3 shows an example of a database (120) spanning across multiple network devices (300, 310, 320) connected by a network (40) in accordance with embodiments of the invention. The database (120) spans across each of the network devices and includes tables (300A, 300B, and 300C) stored on a computer readable storage medium of each network device, respectively. For example, Table A (300A) may be stored on a computer readable storage medium of network device A (300), Table B (300B) may be stored on a computer readable storage medium of network device B (310), and/or Table C (300C) may be stored on a computer readable storage medium of network device C (320). Each of the tables (300A, 300B, 300C) may include the same information, e.g., duplicate, or different information, e.g., non-duplicative. In some embodiments, each of the tables (300A, 300B, 300C) may include duplicate and non-duplicate information.

For example, each of the tables (300A, 300B, 300C) may include a first entry that comprises the maximum data transmission speed of the network (40). Table A (300A) may also include a second entry, not present in either Table B (300B) or Table C (300C), that comprises the current temperature of a processor of network device A (300).

In one or more embodiments of the invention, the database (120) may span across multiple processes in separate address spaces executing on a single network device. FIG. 4 shows an example of a database (120) spanning across a first process (410) and a second process (420) of a network device (400) in accordance with embodiments of the invention. The database (120) spans across each of the processes (410, 420) and includes tables (430A, 430B) stored on a computer readable storage medium of the network device (400). Table A (430A) and Table B (430B) may be stored in different address spaces allocated to the first process (410) and the second process (420), respectively. Each of the tables (430A, 430B) may include the same information, e.g., duplicate, or different information, e.g., non-duplicative. In some embodiments, each of the tables (430A, 430B) may include duplicate and non-duplicate information.

For example, each of the tables (430A, 430B) may include a first entry that comprises a maximum inter-process memory transport rate of the network device (400). Table A (430A) may also include a second entry, not present in Table B (430B), that comprises the quantity of storage allocated to the first process (410).

Returning to FIG. 2, the network device may include a database planner (210). The database planner (210) may manage the database (120). Managing the database (120) may comprise maintaining the location of each table of the database and facilitating inter network device and/or inter process memory transfers between tables of the database. The database planner (210) may also provide the location of each row of each table and each element of each row. In some embodiments of the invention, the database planner (210) may provide a location of a fixed length storage element (531, 535, FIG. 5B) that is associated with a variable length storage element (541, 545, FIG. 5B) when a location of a variable length storage element is requested. An offset (533) and length (534) stored on the fixed length storage element may be used to retrieve the associated variable length storage element.

For example, an agent present on a first network device may request to read data from a table that is present on a second network device. In response to the request from the agent, the database planner (210) may provide the location of the table, a row of the table, and an element of the table on the second network device and thereby enable the agent to retrieve the data from the second table. In one or more embodiments of the invention, the database planner (210) may generate an observer, in response to requests from entities. The generated observer may retrieve data from a table of the database and provide the data to the requesting entity as describe with respect to FIGS. 5A-5F.

In one or more embodiments of the invention, the database planner (210) may include a data structure, e.g., a list, tree, or other structure, that includes the location of each unique entry of the database (120). A unique entry may be an entry of a table where information is first written into the database (210). The information may be subsequently written to other entries of other tables of the database as duplicative information. The data structure may include the information necessary to determine the location of each unique entry of the database (120) and thereby enable data included in any entry of the database (120) to be retrieved and or duplicated to other tables of the database (120).

In one or more embodiments of the invention, the database planner (210) may be executing on the network device and include functionality to update each table of the database (120) in response to a change in an entry of the database. For example, the database planner (210) may include functionality to identify changes to entries of a first table of the database and propagate those changes to the other tables of the database by writing duplicative information to each of the other tables. In one or more embodiments of the invention, the database planner (210) may include functionality to monitor entries of a first table and notify other tables of changes to the entries of the first table. In response to the notification, the other tables may note that the entries of the first table have changed and may thereby notify, in response to requests from agents or other entities, the agents or other entities that entries of the first table have changed.

Returning to FIG. 1B, in one or more embodiments of the invention, the QSM (110) may include functionality to manage QSs. The QSM manager (110) may manage one or more QSs (111A-111M).

Managing QSs may include generating QSIs in response to requests from agents (130), generating observers associated with instances of the QSs (111A-111M), and/or generating modifiers associated with the instances of the QSs (111A-111M). The QSM (110) may generate instances of QSs (111A-111M), observers, and modifiers based on information stored in or derived from the database (120) and/or a database planner (210, FIG. 2). Methods of managing QSIs are further described with respect to FIGS. 8A-8E and QSIs are further described with respect to FIGS. 6-7.

In one or more embodiments of the invention, the QSM (110) may be an embedded hardware device. The embedded hardware device may be, for example, a field programmable gate array (FPGA), application specific integrated circuit (ASIC), a computer hardware processor, and/or digital signal processor (DSP). Other embedded hardware devices may be used without departing from the invention. In one or more embodiments of the invention, the embedded hardware device may be a component of an external entity (140) and provide the functionality by remotely communicating with the network device (100) by a network.

In one or more embodiments, the QSM (110) may comprise instructions, stored on a non-transitory computer readable storage medium, that when executed on a processor of the network device (100) cause the network device (100) to perform the functionality of the QSM (110). In one or more embodiments of the invention, the QSM (110) may be executed by processors of external entities (140) and cause the network device (100) to perform the functionality of the QSM (110) by remotely communicating with the network device (100) by an operable connection.

Figure 6:
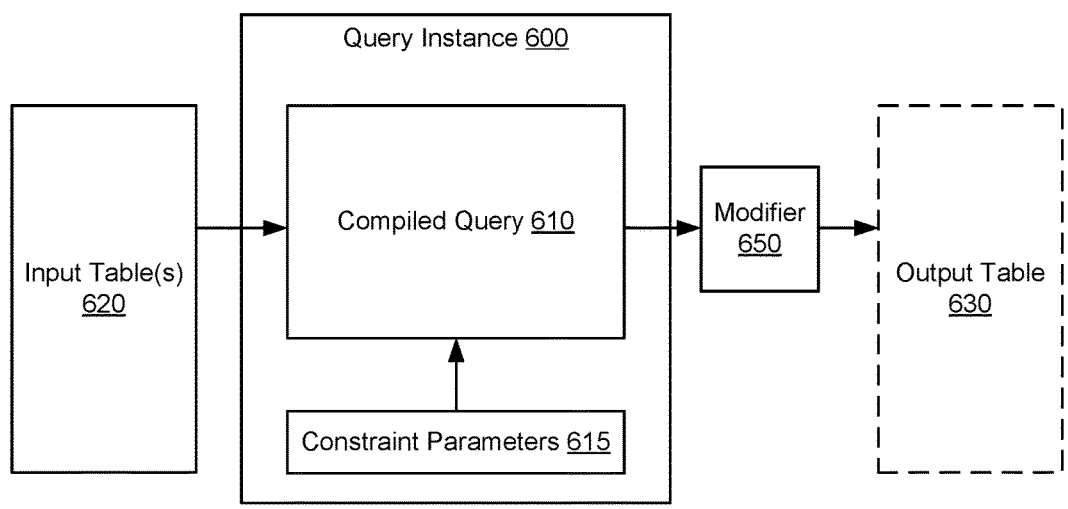
FIG. 6 shows a diagram of a standing query instance including a materialized output in accordance with one or more embodiments of the invention.

Each of the QSs (111A-111M) may include one or more instances of a QS. An example of a QSI (600) in accordance with one or more embodiments of the invention is shown in FIG. 6. The QSI (600) includes a compiled query (610) and one or more constraint parameters (615). Each of the components of the example QSI (600) is described below.

The QSI (600) may include a compiled query (610). The compiled query (610) may include instructions that, when executed by a processor, generate an output based on information included in an input table (620) associated with the QSI (600) and constraint parameters (615) of the QSI (600). In one or more embodiments of the invention, the compiled query (610) may generate output in response to a change in value of one or more entries of the input table (620). In one or more embodiments of the invention, the compiled query (610) may generate output at predetermined times. In one or more embodiments of the invention, the predetermined times may be periodic, e.g., the compiled query (610) may generate an output every five seconds.

The constraint parameters (615) may modify the manner in which the compiled query (610) generates an output, e.g., scales output, excludes input used to determined output, modifies weight of an input, etc.

The input table (620) may be a data structure including one or more elements. The elements of the input table (620) may be generated by one or more observers, as will be discussed in greater detail with respect to FIGS. 6 and 7.

Output generated by the compiled query (610) may be sent to a modifier (650) associated with the QSI (600). The modifier (650) may propagate the output of the compiled query (610) to the output table (630) associated with the QSI (600). The output table (630) will be discussed in greater detail with respect to FIGS. 6 and 7.

Returning to FIG. 1B, the network device (100) may include one or more agents (130) executing on the network device (100) in accordance with one or more embodiments of the invention. The agents (130) may interact with the database (120) of the network device (100), e.g., the agents may desire to read and/or write data to and/or from the database (120). For example, the agents (130) may generate data to be stored in the database (120) or may need to read information from the database (120). In response to read or write requests from the agents (130), the database (120) and/or the database planner (210, FIG. 2) may generate observers or modifiers as required to facilitate the transfer of information between the database (120) and the agents (130).

The agents (130) may also interact with the QSM (110) of the network device (100). In an example, an agent (130) may determine information derived from information stored in the database (120). To determine the information, the agent (130) may send a request for a new SQI to the QSM (110) to determine the derived information. The QSM (110) may generate a new SQI in response to the request and one or more observers to propagate information generated by the new SQI to the agent (130). The QSM (110) may generate a compiled query of the new SQI in accordance with the indicator the type of the requested query.

Figure 7:
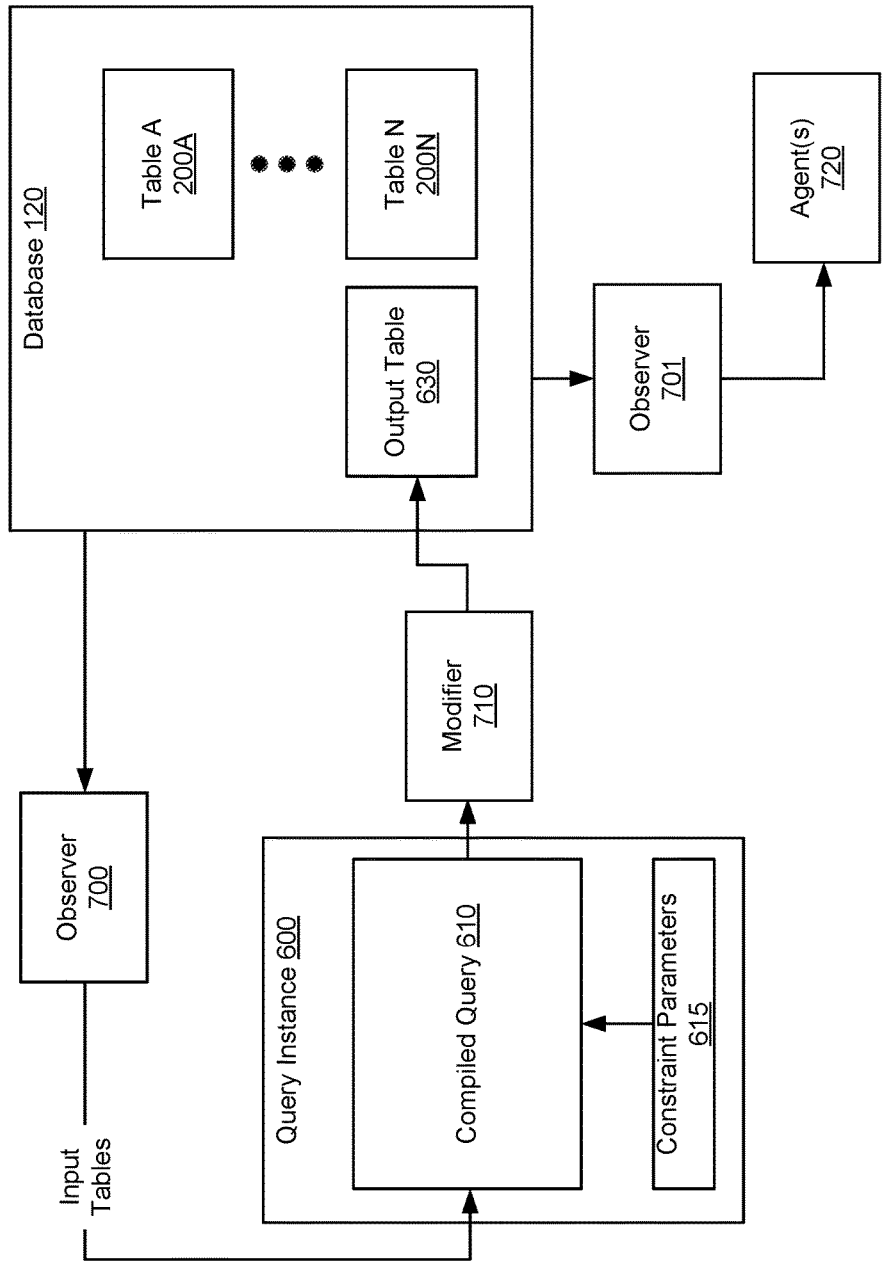
FIG. 7 shows a diagram of a standing query interacting with a database in accordance with one or more embodiments of the invention.

FIG. 7 shows the example of the QSI (600), shown in FIG. 6, interacting with a database (120) in accordance with one or more embodiments of the invention. In the example shown in FIG. 7, the QSI (600), observers (700, 701), and modifier (710) were generated in response to a request from an agent (720). The request included a query type to be generated, constraint parameters, and a list of one or more information elements of the database (120) to be used as input to the compiled query (610).

A first observer (700) was generated to read information from the database (120) and supply the information to the compiled query (610) via an input table. More specifically, the first observer (700) observes information elements stored in one or more tables (200A-200N) of the database and propagates the information to the compiled query (610).

A second observer (701) was generated to read output, generated by the compiled query (610), stored in the output table (630) associated with the QSI (600) and supply the output to the agent (720) requested the QSI (600).

A modifier (710) was generated to propagate output generated by the compiled query (610) to the output table (630). While the output table (630) is shown as a separate table in FIG. 7, the output table (630) may be a portion of any table of the database (120) without departing from the invention.

Thus, as shown in FIG. 7, QSIs interacting with the database (120) read/write information to/from the database by observers and modifiers. Similarly, agents interacting with the database (120) also read/write information to/from the database by observers and modifiers.

FIG. 8A shows a flowchart in accordance with one or more embodiments of the invention. The method depicted in FIG. 8A may be used to generate QIs in response to requests from entities such as, for example, agents in accordance with one or more embodiments of the invention. One or more steps shown in FIG. 8A may be omitted, repeated, and/or performed in a different order among different embodiments.

In Step 800, a QSM of a network device obtains a request for a new instance of a query service. The QSM may obtain the request from a message from an agent. The agent may be executing on the network device on which the QSM is executing. The request may include a query type, one or more constraint parameters, whether the compiled query is to be standing or one-shot, and information stored in a database on which the new QSI is to operate.

In Step 801, the QSM determines whether a QS matching the query type included in the request exists on the network device. A QS may be determined as matching a QS if both the query type and whether the query is standing or one-shot, specified in the request obtained in Step 800, match a QS existing on the network device. If the query type does not match an existing QS, the method proceeds to Step 804. If the query type does match an existing QS, the method proceeds to Step 806.

In Step 802, the QSM generates a new QS based on the obtained query request. Specifically, the QSM may generate a new QS including the query type indicated in the obtained query request.

In one or more embodiments of the invention, generating a new QS may include compiling a query, e.g., generating a compiled query. In one or more embodiments of the invention, generating a new QS may include linking compiled byte code. In one or more embodiments of the invention, the newly compiled query may be generated as either a standing or one-shot depending on the request.

In Step 803, the QSM determines whether the constraint parameters of a QSI existing on the network device match the constraint parameters included in the obtained request. If the constraint parameters of the obtained request do not match the constraint parameters of an existing QSI, the method proceeds to Step 808. If the constraint parameters of the obtained request do match the constraint parameters of an existing instance of a SQS, the method proceeds to Step 806.

In Step 804, the QSM generates a new QSI of the QS, corresponding to the query type included in the obtained request, including constraint parameters based on the constraint parameters included in the obtained request. Specifically, the QSM may make a copy the compiled query associated with the SQS corresponding to the query type included in the obtained request and constrain the compiled query based on the constraint parameters included in the obtained request. The compiled query may be programmed as either standing or one-shot depending, depending on request.

In one or more embodiments of the invention, the constraint parameters change the behavior of the compiled query. The constraint parameters may be variables, utilized by the compiled query, which change the output produced by the compiled query when operating on the same input.

In Step 805, the QSM generates observers and/or modifiers associated with the new QSI. The QSM may generate one or more observers associated with the new QSI that supplies the compiled query of the new QSI with data on which the compiled query operates. The observers may supply the data to an input table of the new QSI as shown, for example, in FIG. 7. The QSM may also generate one or more modifiers associated with the QSI that propagates output generated by the compiled query of the QSI. The modifiers may propagate the output generated by the compiled query to an output table associated with the new QSI.

In one or more embodiments of the invention, the QSM may generate one or more observers associated with an agent from which the request was obtained in Step 800. The observer may be linked with the output table where data generated by the compiled query is stored and the agent from which the request was obtained in Step 800. The observer may propagate changes to the output table to the agent and thereby notify the agent of new output generated by the new instance of the QSI requested by the agent.

In one or more embodiments of the invention, the observers may be configured to observer a fixed length storage element (531, 535, FIG. 5B) when the requesting entity requests to observe a variable length data storage element (541, 545, FIG. 5B). As discussed above, when a variable length datum is stored in a variable length data storage portion (540, FIG. 5B) of a row (520, FIG. 5B), an offset and length may be stored in a fixed length data storage element that is associated with the variable length data storage element. To access the variable length datum, the offset and length stored in the fixed length storage element may be used to allow the observer to access the datum. The observers may perform the methods shown in FIGS. 10A and 10B to retrieve fixed length and/or variable length data from a row.

Returning to Step 803 in FIG. 8A, the method may proceed to Step 806 if an existing QSI includes constraint parameters that are the same as those included in the query request obtained in Step 800.

In Step 806, the QSM generates observer(s) associated with an agent from which the new QSI request was obtained in Step 800. The observer may be linked with the output table where data generated by the existing QSI identified in Step 806 is stored and the agent from which the request was obtained in Step 800. The observer may propagate changes to the output table to the agent and thereby notify the agent of new output generated by the existing QSI. In other words, if an existing QSI includes the same constrain parameters as those of the request, an observer may be generated to propagate results of the existing QSI to the agent rather than generating a new QSI and a new modifier.

In one or more embodiments of the invention, the observer may propagate changes to the output table to an agent in response to a notification from the database that the element of the database the observer is observing, e.g., one or more elements of the output table, have changed.

In one or more embodiments of the invention, the observer may poll the database at predetermined times to determine if the observed elements of the database have changed. If the database indicates the observed elements of the database have changed, the observer may receive each modification to the observed elements from the database and propagate the modifications to the agent from which the query request was obtained in Step 800. In one or more embodiments of the invention, the predetermined times may be intermittent.

Thus, the methods shown in FIG. 8A may be used to generate observers, modifiers, and QSIs in response to requests from agents.

FIG. 8B shows a flowchart in accordance with one or more embodiments of the invention. The method depicted in FIG. 8B may be used to generate observers in response to requests for QSIs from agents in accordance with one or more embodiments of the invention. One or more steps shown in FIG. 8B may be omitted, repeated, and/or performed in a different order among different embodiments.

In Step 820, a QSM of a network device obtains one or more input table targets. The input table targets may be one or more elements of a database on which a requested QSI is to operate. The input table targets may be obtained from a request from an agent requesting the QSI.

In Step 822, the QSM selects one of the input table targets.

In Step 824, the QSM determines the location of the input table target selected in Step 822. The QSM may determine the location of the input table target by requesting the location from a database planner (210, FIG. 2) that manages the database (120, FIG. 2). The location of the input table target may be an element a table of the database (120, FIG. 2).

In Step 826, the QSM generates an observer based on the location of the input table target. The location of the input table target may be located in the same address space as the input table of the QSI, located in a different address space than the input table of the QSI, or located in a different address space of a different network device than the input table of the QSI. The QSM may generate observers linked to memory transport protocols and/or inter-device memory transport protocols to facilitate propagating information from the database to the input table of a QSI.

For example, if an input table is located in a different address space than the input table of the QSI, the QSM may generate a first observer, in the address space of the input table target, linked to a memory transport protocol between the address space of the input table target and the address space of the input table. The SQS may generate a second observer, in the address space of the input table, linked to the memory transport protocol between the address space of the input table target and the address space of the input table and thereby propagate changes to the input table target to the input table.

In a second example, if an input table is located in a different address space of a different network device, the QSM may generate a first observer, in the address space of the different network device of the input table target, linked to an inter-device memory transport protocol between the different network device and the network device on which the input table exists. The SQS may generate a second observer, in the address space of the input table, linked to the inter-device memory transport protocol between the different network device and the network device on which the input table exists and thereby propagate changes to the input table target to the input table.

In Step 828, the QSM determines whether all input table targets are observed by observers. If all input table targets are observed by observers, the method may end. If all input table targets are not observed by observers, the method may proceed to Step 822.

Thus, the method shown in FIG. 8B may be used to generate observers to propagate changes to input table targets located in a database to an input table of a QSI.

While the method shown in FIG. 8B is illustrated as generating unique observers for each input table target, one of ordinary skill in the art will appreciate that the method may be implements by utilizing a single observer that observes multiple input table without departing from the invention.

FIG. 8C shows a flowchart in accordance with one or more embodiments of the invention. The method depicted in FIG. 8C may be used to generate modifiers in response to requests for QSIs from agents in accordance with one or more embodiments of the invention. One or more steps shown in FIG. 8C may be omitted, repeated, and/or performed in a different order among different embodiments.

In Step 830, a QSM of a network device obtains one or more output table targets. The output table targets may be one or more elements of a database on which a requested QSI is to propagate its output. The output table targets may be obtained from a request from an agent requesting the QSI.

In Step 832, the QSM selects one of the output table targets.

In Step 834, the QSM determines the location of the output table target selected in Step 832. The QSM may determine the location of the output table target by requesting the location from a database planner (210, FIG. 2) that manages the database (120, FIG. 2). The location of the output table target may be an element of a table of the database (120, FIG. 2).

In Step 836, the QSM generates a modifier based on the location of the output table target. The modifier may write data received from the QSI to the location of the output table target, e.g., one or more elements of a table of the database.

Figure 10A:
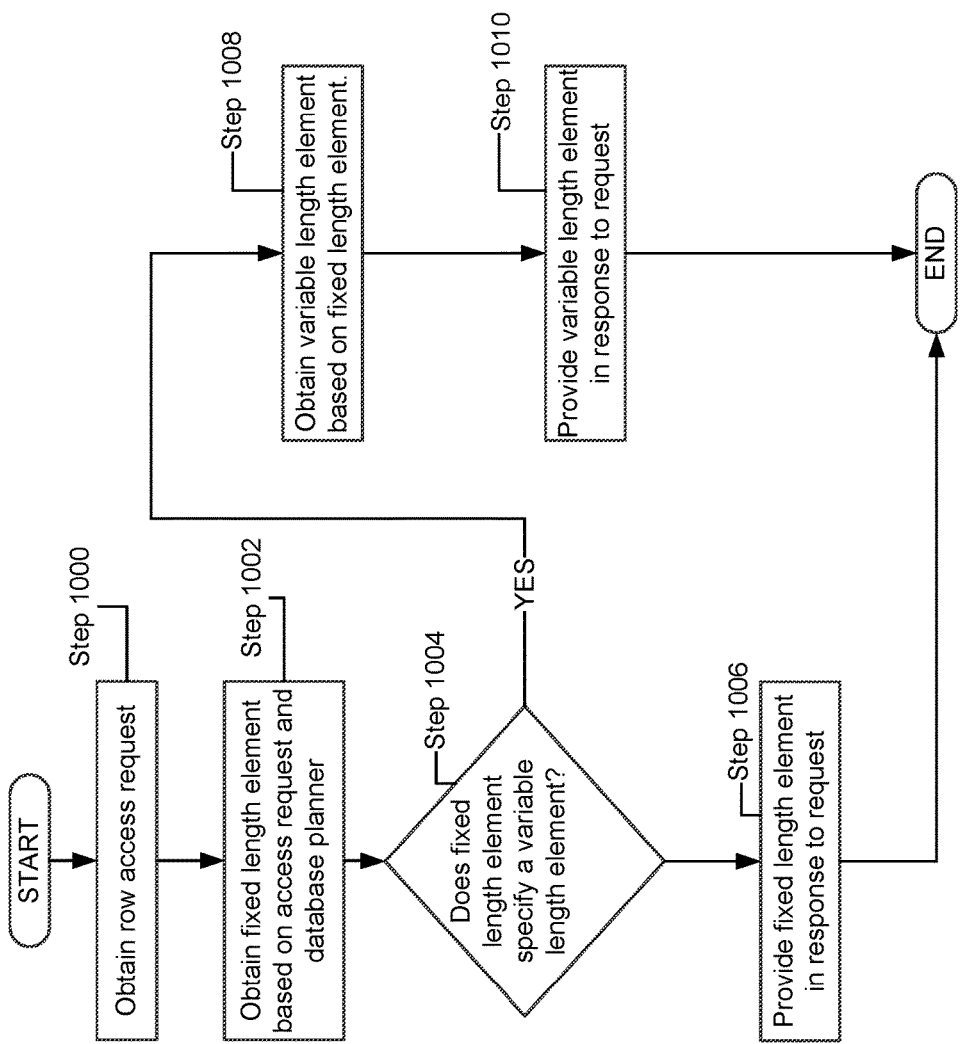
FIG. 10A shows a flowchart of a method of reading data from a row of a database in accordance with one or more embodiments of the invention.
Figure 10B:
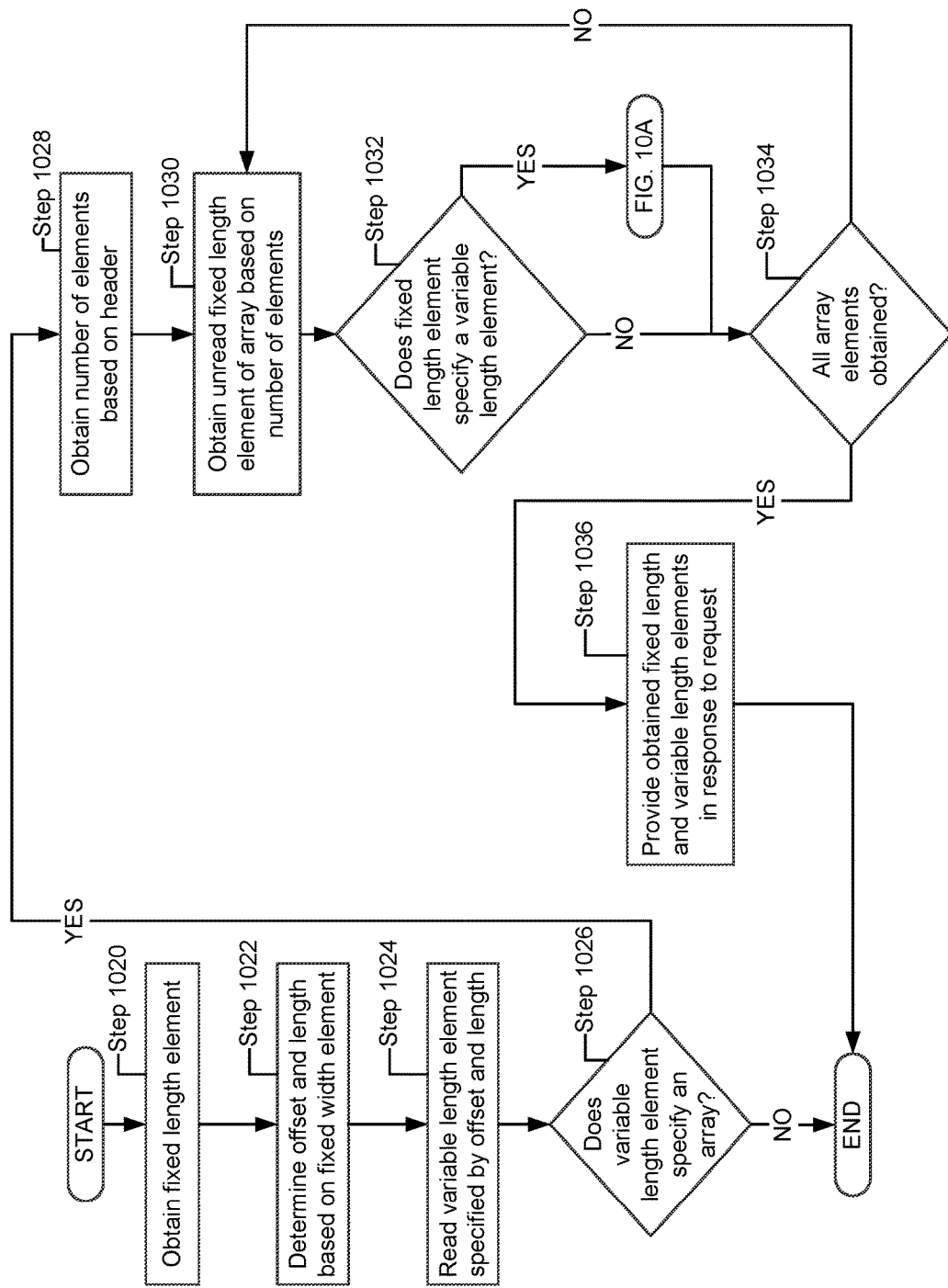
FIG. 10B shows a flowchart of a method of reading data from a row of a database in accordance with one or more embodiments of the invention.
Figure 10C:
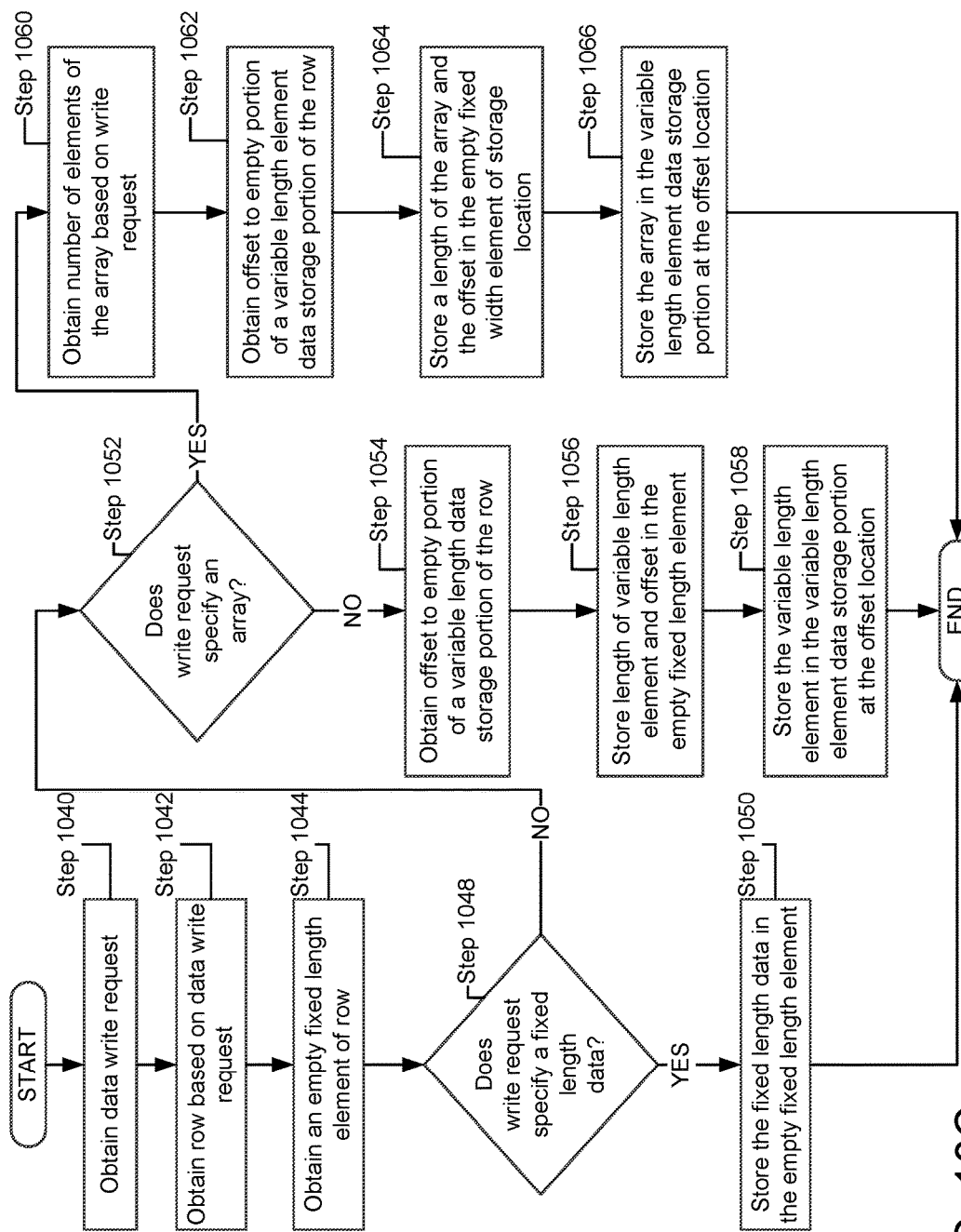
FIG. 10C shows a flowchart of a method of storing data in a row of a database in accordance with one or more embodiments of the invention.

In one or more embodiments of the invention, the modifier may perform the methods shown in FIG. 10C-10D to store the write the data to the location of the output table target.

In Step 838, the QSM determines whether all output table targets have associated modifiers. If all output table targets have associated modifiers, the method may end. If all output table targets do not have associated modifiers, the method may proceed to Step 832.

Thus, the method shown in FIG. 8C may be used to generate modifiers to propagate output generated by the QSI to an output table of a database.

While the method shown in FIG. 8D is illustrated as generating unique modifiers for each output table target, one of ordinary skill in the art will appreciate that the method may be implemented by utilizing a single modifier associated with all of the output table targets without departing from the invention.

As discussed with respect to FIGS. 8B and 8C, observers and modifiers may be employed to read and/or write data to and/or from a database by a QSI. Similarly, observers and modifiers may be employed to read and/or write data to and/or from a database by an agent.

FIG. 8D shows a flowchart in accordance with one or more embodiments of the invention. The method depicted in FIG. 8D may be used to generate observers in response to requests to read data from a database by an agent in accordance with one or more embodiments of the invention. One or more steps shown in FIG. 8D may be omitted, repeated, and/or performed in a different order among different embodiments.

In Step 840, a database may obtain one or more observer targets. The database may obtain the observer targets based on a request from an agent. The request may include one or more elements of the database.

In Step 842, the database may determine the location of the observer targets. The database may determine the location of the observer targets by requesting the location of each observer target from a database planner (210, FIG. 2).

In Step 844, the database may generate one or more observers based on the location of the observed targets.

FIG. 8E shows a flowchart in accordance with one or more embodiments of the invention. The method depicted in FIG. 8E may be used to generate modifiers in response to requests to write data to a database by an agent in accordance with one or more embodiments of the invention. One or more steps shown in FIG. 8E may be omitted, repeated, and/or performed in a different order among different embodiments.

In Step 850, a database may obtain one or more modifier targets. The database may obtain the modifier targets based on a request from an agent. The request may include one or more elements of the database.

In Step 842, the database may determine the location of the modifier targets. The database may determine the location of the modifier targets by requesting the location of each modifier target from a database planner (210, FIG. 2).

In Step 844, the database may generate one or more modifiers based on the location of the modifier targets.

Figure 9A:
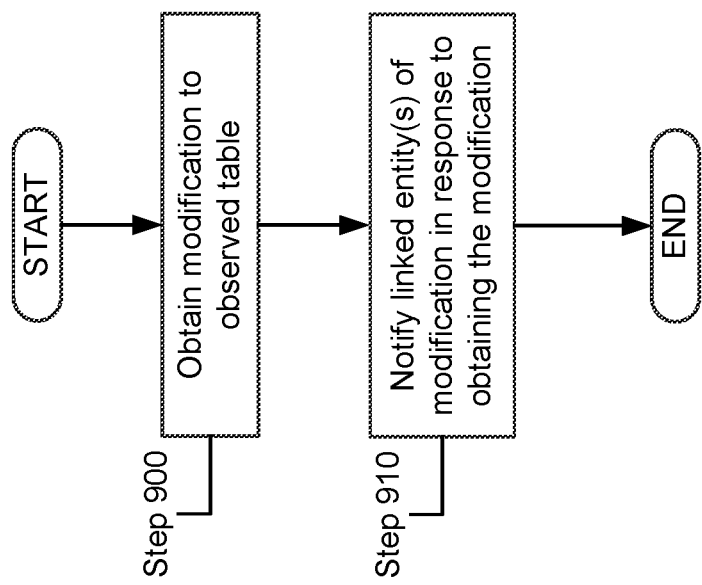
FIG. 9A shows a flowchart of a method of obtaining modifications to a table in accordance with one or more embodiments of the invention.

FIG. 9A shows a flowchart in accordance with one or more embodiments of the invention. The method depicted in FIG. 9A may be used by an observer to notify a linked entity of a change to an observed element of a database in accordance with one or more embodiments of the invention. One or more steps shown in FIG. 9A may be omitted, repeated, and/or performed in a different order among different embodiments.

In Step 900, an observer may obtain a modification to an observed table. As described with respect to FIG. 5, each element of each table may include a subscription list. When an element of a table of a database is modified, the database may notify each observer listed in the subscription list of the modification. The observer may obtain the modification by the notification of change provided by the database.

In one or more embodiments of the invention, the observer may periodically poll the database to determine whether an observed element of a table has been modified. The observer may determine whether the observed element of the table of the database has been modified based on the write history of the element. In other words, the observer may review the write history of the element since the element was last observed by the observer for modification.

In Step 910, the observer may notify any linked entities of the modifications obtained in Step 900. As described with respect to FIGS. 7 and 8A, an observer may be linked to one or more entities. The entities may be input tables of QSIs, agents, or any other consumer of information. The observer may notify each linked entity of the modification of the element of the database the observer is observer is observing.

In one or more embodiments of the invention, the modification may be the addition of a query completion indicator. An entity that receives a query completion indicator from an observer may be programmed to interpret the query completion indicator to mean that a one-shot QSI, that generates the output observed by the observer, has generated a complete output.

Figure 9B:
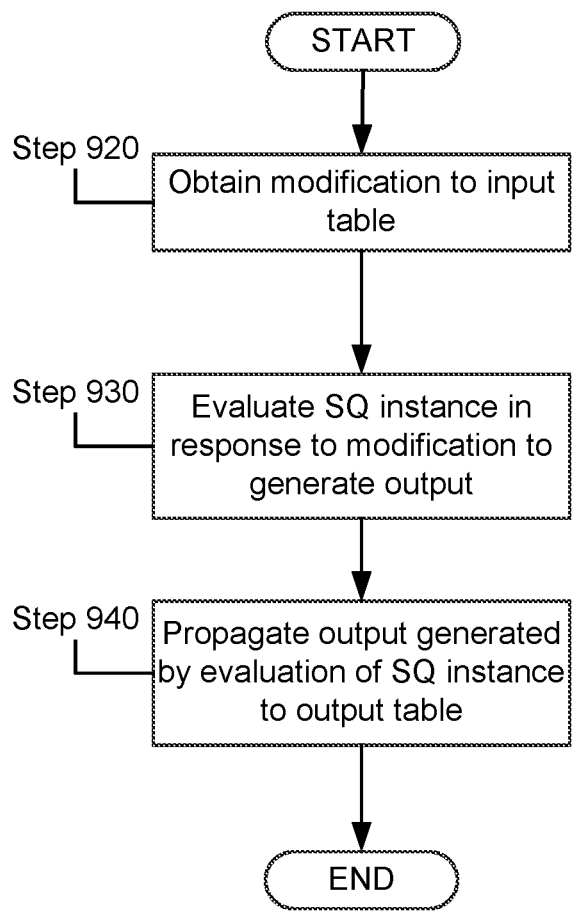
FIG. 9B shows a flowchart of a method of evaluating a SQI in accordance with one or more embodiments of the invention.

FIG. 9B shows a flowchart in accordance with one or more embodiments of the invention. The method depicted in FIG. 9B may be used by a QSI to evaluate a SQ in accordance with one or more embodiments of the invention. One or more steps shown in FIG. 9B may be omitted, repeated, and/or performed in a different order among different embodiments.

In Step 920, a QSI may obtain a modification to an input table. The modification may be obtained by an observer performing the method shown in FIG. 9A.

In Step 930, the QSI may execute the compiled query of the SQ in response to the modification. Executing the compiled query may generate output.

In Step 940, the QSI may propagate output generated by evaluation of the QSI to an output table. The output generated by the QSI may be propagated to an output table by the method shown in FIG. 9C.

Figure 9C:
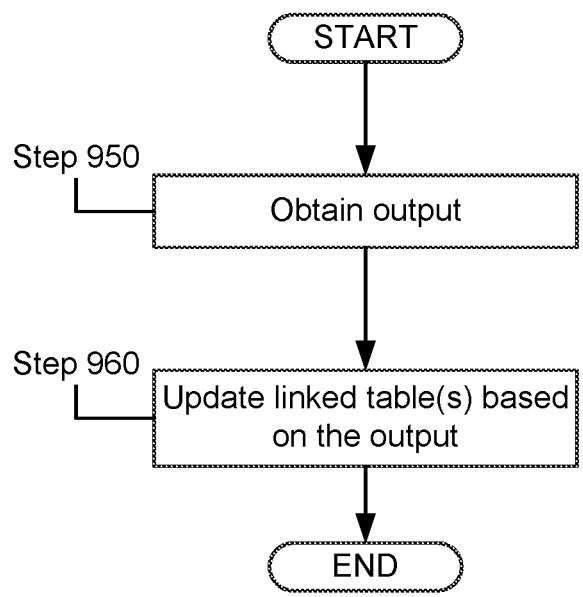
FIG. 9C shows a flowchart of a method of propagating output to a table in accordance with one or more embodiments of the invention.

FIG. 9C shows a flowchart in accordance with one or more embodiments of the invention. The method depicted in FIG. 9C may be used by a modifier to propagate output in accordance with one or more embodiments of the invention. One or more steps shown in FIG. 9C may be omitted, repeated, and/or performed in a different order among different embodiments.

In Step 950, a modifier may obtain an output. The modifier may obtain the output from a compiled query of a QSI, an agent, or any other entity.

In Step 960, the modifier updates one or more linked tables based on the obtained output.

FIG. 10A shows a flowchart in accordance with one or more embodiments of the invention. The method depicted in FIG. 10A may be used by an entity to read data from a row that includes a fixed length data storage portion and a variable length data storage portion in accordance with one or more embodiments of the invention. One or more steps shown in FIG. 10A may be omitted, repeated, and/or performed in a different order among different embodiments.

In Step 1000, an entity obtains a row access request. The entity may be an agent, an observer, or any other entity. The entity may be executing on a network device that includes a database or the entity may be executing on another network device that is linked to the network device including the database.

The row access request may specify data stored in the row of a table of the database of the network device.

In Step 1002, the entity may obtain a fixed length datum stored in a fixed length storage element of the row. The entity may obtain the fixed length datum by requesting a location of the fixed length datum from a database planner. The entity may read a fixed length storage element at the location provided by the database planner. The fixed length datum may be stored in the fixed length storage element.

In Step 1004, the entity determines whether the contents stored in the fixed length storage element is a fixed length datum or specifies a location of a variable length datum stored in the row.

In one or more embodiments of the invention, the entity may make the determination based on a row definition included in the row. The row definition may specify whether fixed length storage elements of the row include fixed length data or location of variable length data.

In one or more embodiments of the invention, the entity may make the determination based on a flag included in fixed length storage element. The flag may specify whether the fixed length storage element of the row includes fixed length data or location of variable length data. The flag may be, for example, a single bit of the fixed length storage element. Other flags may be used without departing from the invention.

If the entity determines that the contents stored in the fixed length storage element is a fixed length datum, the method proceeds to Step 1006. If the entity determines that the contents stored in the fixed length storage element specifies a location of a variable length datum, the method proceeds to Step 1008.

In Step 1006, the entity provides the contents of the fixed length storage element of the row in response to the request.

Returning to Step 1004, the method may proceed to Step 1008 if the entity determines that the contents stored in the fixed length storage element specifies a location of a variable length datum.

In Step 1008, the entity obtains a variable length datum based on the contents of the fixed length storage element.

In one or more embodiments of the invention, the contents of the fixed length storage element specifies an offset and a length. The entity may obtain the variable length datum by reading a portion of the row specified by the offset and the length, as described with respect to FIGS. 5A-5E.

In Step 1010, the entity provides the portion of the row read in Step 1008 in response to the request.

FIG. 10B shows a flowchart in accordance with one or more embodiments of the invention. The method depicted in FIG. 10B may be used by an entity to read variable length data that specifies an array from a row that includes a fixed length data storage portion and a variable length data storage portion in accordance with one or more embodiments of the invention. One or more steps shown in FIG. 10B may be omitted, repeated, and/or performed in a different order among different embodiments.

In Step 1020, the entity may obtain a fixed length datum stored in a fixed length storage element of the row. The entity may obtain the fixed length datum by requesting a location of a variable length datum from a database planner. The variable length datum may be an array. The entity may read a fixed length storage element at the location provided by the database planner. The fixed length datum may be stored in the fixed length storage element. The fixed length datum may specify an offset and a length.

In Step 1022, the entity determines an offset and length based on the fixed length datum obtained in Step 1020. As described in Step 1020, the fixed length datum may specify the offset and length.

In Step 1024, the entity reads a variable length datum using the offset and length. The entity may perform the method described in FIG. 10A to read the variable length datum.

In Step 1026, the entity determines whether the variable length datum specifies an array.

In one or more embodiments of the invention, the entity may determine whether the variable length datum specifies an array based on whether the variable length datum includes a header as described with respect to FIGS. 5E-5F.

In one or more embodiments of the invention, the entity may determine whether the variable length datum specifies an array based on a flag included in the variable length datum. The flag may be a bit of a variable length storage element. The bit may have a first value to indicate that the variable length storage element stores an array. Other flags may be used without departing from the invention.

If the entity determines that the variable length storage element does not include an array, the method may end.

If the entity determines that the variable length storage element includes an array, the method proceeds to step 1028.

In Step 1028, the entity obtains a number of elements included in the array based on a header. As described with respect to FIGS. 5E-5F, the header of an array stored in a variable length storage element specifies the number of elements of the array.

In Step 1030, the entity reads an unread fixed length element of the array. The entity may read an unread fixed length element of the array using the information included in the header as described with respect to FIGS. 5E-5F.

In Step 1032, the entity determines whether the fixed width datum read in Step 1030 specifies a variable length datum. If the fixed width datum specifies a variable length datum, the entity may perform the method shown in FIG. 10A to read the variable length datum. The methods proceeds to Step 1034 following Step 1032.

In Step 1034, the entity determines whether all elements of the array have been obtained. The entity may make the determination by comparing the number of read elements to the number of elements of the array specified by the header. If the entity determines that all of the elements of the array have been obtained, the method proceeds to Step 1036. If all of the elements of the array have not been obtained, the method returns to Step 1030.

In Step 1036, the entity provides all of the obtained fixed length data and variable length data in response to the request. The entity may provide the data by reformatting the data into an array format. The method may end following Step 1036.

FIG. 10C shows a flowchart in accordance with one or more embodiments of the invention. The method depicted in FIG. 10C may be used by an entity to store data in a row that includes a fixed length data storage portion and a variable length data storage portion in accordance with one or more embodiments of the invention. One or more steps shown in FIG. 10C may be omitted, repeated, and/or performed in a different order among different embodiments.

In Step 1040, an entity obtains a data write request. The data write request may specify a fixed length datum or variable length datum to be stored in a database. The variable length datum may be an array.

In Step 1042, the entity obtains a row based on the write request.

In one or more embodiments of the invention, the row may be specified by the data write request.

In one or more embodiments of the invention, the row may be obtained from a database planner.

In Step 1044, an empty fixed length storage element of the row is determined. The empty fixed length storage element of the row may be determined by, for example, sending a request for an empty storage element to the data base planner or reading fixed length storage elements of the row to identify an empty storage element.

In Step 1048, the entity determines whether the write request specifies a fixed length datum. If the write request specifies a fixed length datum, the method proceeds to Step 1050. If the write request does not specify a fixed length datum, the method proceeds to Step 1052.

In Step 1050, the entity stores the fixed length datum in the empty fixed length storage element.

In Step 1052, the entity determines whether the write request specifies an array. If the write request does not specify an array, the method proceeds to Step 1054. If the write request specifies an array, the method proceeds to Step 1060.

In Step 1054, the entity obtains an offset to an empty portion of a variable length data storage portion of the row.

In one or more embodiments of the invention, the offset may be obtained by reading a row definition that specifies an empty portion of the of the variable length data storage portion of the row.

In one or more embodiments of the invention, the offset may be obtained by reading a flag stored at a location within the variable length data storage portion of the row that indicates an empty portion of the variable length data storage portion of the row. The flag may be, for example, a bit pattern. Other flags may be used without departing from the invention.

In Step 1056, the entity stores a length of the variable length datum and the offset in the empty fixed length storage element determined in Step 1044.

In Step 1058, the entity stores the variable length datum in the variable length data storage portion of the row specified by the offset and length stored in Step 1056. The method may end following Step 1058.

As discussed with respect to Step 1052, the method may proceed to Step 1060 if the write request specifies an array.

In Step 1060, the entity obtains the number of elements of the array based on the write request.

In Step 1062, the entity obtains an offset to an empty portion of a variable length data storage portion of the row.

In one or more embodiments of the invention, the offset may be obtained by reading a row definition that specifies an empty portion of the of the variable length data storage portion of the row.

In one or more embodiments of the invention, the offset may be obtained by reading a flag stored at a location within the variable length data storage portion of the row that indicates an empty portion of the variable length data storage portion of the row. The flag may be, for example, a bit pattern. Other flags may be used without departing from the invention.

In Step 1064, the entity stores a length of the array and the offset determined in Step 1062 in the empty fixed length storage element determined in Step 1044.

In Step 1066, the entity stores the array in the variable length data storage portion of the row at the location specified by the offset and length stored in Step 1064. The method may end following Step 1066.

Embodiments of the invention may provide one or more of the following advantages: (i) embodiments of the invention may enable both fixed length and variable length data to be stored in a row, (ii) the fixed length and/or variable length data may be read from the row without referencing other data structures, and (iii) the read and/or write performance may be improved by reducing the processing and/or storage system access requests to read data stored in the database.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A network device, comprising:
    a computer hardware processor;
    a memory, accessible by the computer hardware processor, storing:
        a database, and
        a plurality of rows, wherein a first row of the plurality of rows comprises:
            a fixed length data storage portion, and
            a variable length data storage portion comprising an existing variable length data;
    wherein the database executes on the computer hardware processor and is programmed to:
        obtain a write request that specifies a first variable length data;
        process, in response to the write request, the first row to identify an empty portion of the variable length data storage portion;
        determine a first offset that specifies a first location of the empty portion;
        store the first offset and a first length of the first variable length data in a first fixed length storage element of the fixed length data storage portion; and
        store the first variable length data in the empty portion of the variable length data storage portion.

2. The network device of claim 1, wherein the database is further programmed to:
    generate an association between the first fixed length storage element and the variable length data, wherein the association specifies that the variable length data is accessible using the first fixed length storage element;
    recording the association in a database planner.

3. The network device of claim 1, wherein the database is further programmed to:
    obtain a read request that specifies a second variable length data;
    determine a second row that stores the second variable length data;
    process the second row to obtain a second fixed length storage element that specifies a second offset and a second length of the second variable length data;
    read a portion of a variable length data storage portion of the second row using the second offset and the length of the second variable length data; and
    provide the portion of the variable length data storage portion to a recipient based on the read request.

4. The network device of claim 3, wherein the database determines the second row using an association stored in a database planner,
    wherein the association specifies that the second variable length data is accessible using the second fixed length storage element.

5. The network device of claim 1, wherein the memory comprises volatile storage.

6. The network device of claim 1, wherein the database is further programmed to:
    obtain a second write request that specifies a fixed length data;
    process the first row to identify an empty fixed length storage element; and
    store the fixed length data in the empty fixed length storage element.

7. The network device of claim 1, wherein the database is further programmed to:

obtain a read request that specifies a fixed length data;
determine a second row that stores the fixed length data;
process the second row to obtain a second fixed length storage element that stores the second fixed length data;
read contents of the second fixed length storage element;
provide the contents of the second fixed length storage element to a recipient based on the read request.

8. The network device of claim 1, wherein the first row further comprises:
  a row definition that specifies a second location that divides the first row between the fixed length data storage portion and the variable length data storage portion.

9. The network device of claim 8, wherein the second location is specified by a second offset.

10. The network device of claim 8, wherein the first location is specified by a flag stored at the second location.

11. A non-transitory computer readable medium comprises instructions, which when executed by a process performs a method, the method comprising:
  obtaining a write request that specifies a first variable length data;
  identifying a first row of a table based on the write request, the first row comprising an existing variable length data;
  processing the first row to identify an empty portion of a variable length data storage portion of the first row;
  determining a first offset that that specifies a first location of the empty portion;
  storing the first offset and a first length of the first variable length data in a first fixed length storage element of the fixed length data storage portion; and
  storing the first variable length data in the empty portion of the variable length data storage portion.

12. The computer readable medium of claim 11, wherein the method further comprises:
  obtaining a read request that specifies a second variable length data;
  determining a second row that stores the second variable length data;
  processing the second row to obtain a second fixed length storage element that specifies a second offset and a second length of the second variable length data;
  reading a portion of a variable length data storage portion of the second row using the second offset and the second length of the second variable length data; and
  providing the portion of the variable length data storage portion to a recipient based on the read request.

13. The computer readable medium of claim 11, wherein the method further comprises:
  obtaining a second write request that specifies a fixed length data;
  processing the first row to identify an empty fixed length storage element; and
  storing the fixed length data in the empty fixed length storage element.

14. The computer readable medium of claim 11, wherein the method further comprises:
  obtaining a read request that specifies a fixed length data;
  determining a second row that stores the fixed length data;
  processing the second row to obtain a second fixed length storage element that stores the second fixed length data;
  reading contents of the second fixed length storage element;
  providing the contents to a recipient based on the read request.

15. A method for operating a network device, the method comprising:
  obtaining a write request that specifies a first variable length data;
  identifying a first row of a table based on the write request, the first row comprising an existing variable length data;
  processing the row to identify an empty portion of a variable length data storage portion of the row;
  determining a first offset that that specifies a first location of the empty portion;
  storing the first offset and a first length of the first variable length data in a first fixed length storage element of the fixed length data storage portion; and
  storing the first variable length data in the empty portion of the variable length data storage portion.

16. The method of claim 15, wherein the method further comprises:
  obtaining a read request that specifies a second variable length data;
  determining a second row that stores the second variable length data;
  processing the second row to obtain a second fixed length storage element that specifies a second offset and a second length of the second variable length data;
  reading a portion of a variable length data storage portion of the second row using the second offset and the second length of the second variable length data; and
  providing the portion of the variable length data storage portion to a recipient based on the read request.

17. The method of claim 15, wherein the method further comprises:
  obtaining a second write request that specifies a fixed length data;
  processing the row to identify an empty fixed length storage element; and
  storing the fixed length data in the empty fixed length storage element.

18. The method of claim 15, wherein the method further comprises:
  obtaining a read request that specifies a fixed length data;
  determining a second row that stores the fixed length data;
  processing the second row to obtain a second fixed length storage element that stores the second fixed length data;
  reading contents of the second fixed length storage element;
  providing the contents to a recipient based on the read request.

* * * * *

UNITED STATES PATENT AND TRADEMARK OFFICE
CERTIFICATE OF CORRECTION

PATENT NO. : 10,261,949 B2  
APPLICATION NO. : 15/274276  
DATED : April 16, 2019  
INVENTOR(S) : Michael Greenwald, Stephen Schleimer and Daniel Greene Page 1 of 1

It is certified that error appears in the above-identified patent and that said Letters Patent is hereby corrected as shown below:

On the Title Page

In the Abstract, item (57), Line 7, the phrase "offset that that specifies" should read -- offset that specifies --.

In the Claims

Column 23, in Claim 11, Line 28, the phrase "offset that that specifies" should read -- offset that specifies --.

Column 24, in Claim 15, Line 18, the phrase "offset that that specifies" should read -- offset that specifies --.

Signed and Sealed this  
Twenty-second Day of October, 2019

Andrei Iancu  
*Director of the United States Patent and Trademark Office*